US011689468B2

(12) United States Patent
Koren et al.

(10) Patent No.: US 11,689,468 B2
(45) Date of Patent: Jun. 27, 2023

(54) DEVICE CLASSIFICATION USING MACHINE LEARNING MODELS

(71) Applicant: FORESCOUT TECHNOLOGIES, INC., San Jose, CA (US)

(72) Inventors: Itai Koren, Tel Aviv (IL); Zvika Plotkin, Tel Aviv (IL)

(73) Assignee: FORESCOUT TECHNOLOGIES, INC., San Jose, CA (US)

( * ) Notice: Subject to any disclaimer, the term of this patent is extended or adjusted under 35 U.S.C. 154(b) by 121 days.

(21) Appl. No.: 17/139,704

(22) Filed: Dec. 31, 2020

(65) Prior Publication Data
US 2022/0210079 A1 Jun. 30, 2022

(51) Int. Cl.
*H04L 47/2441* (2022.01)
*G06N 20/00* (2019.01)
*H04L 43/04* (2022.01)
*H04L 43/062* (2022.01)

(52) U.S. Cl.
CPC ......... *H04L 47/2441* (2013.01); *G06N 20/00* (2019.01); *H04L 43/04* (2013.01); *H04L 43/062* (2013.01)

(58) Field of Classification Search
CPC ... H04L 47/2441; H04L 43/04; H04L 43/062; H04L 41/0816; H04L 41/14; H04L 41/16; H04L 67/34; H04L 63/1441; H04L 63/1425; G06N 20/00; G06K 9/6267
See application file for complete search history.

(56) References Cited

U.S. PATENT DOCUMENTS

| | | | |
|---|---|---|---|
| 2015/0254555 A1* | 9/2015 | Williams, Jr. | G06N 3/084 706/14 |
| 2019/0228336 A1* | 7/2019 | Kanagawa | G06N 3/0481 |
| 2019/0245866 A1* | 8/2019 | Anderson | H04L 63/1425 |
| 2019/0306731 A1* | 10/2019 | Raghuramu | H04L 63/102 |
| 2019/0336096 A1* | 11/2019 | Itu | G06N 3/0445 |
| 2020/0007391 A1* | 1/2020 | Yang | H04L 63/14 |
| 2020/0134391 A1* | 4/2020 | Assaderaghi | G06V 10/82 |
| 2020/0382527 A1* | 12/2020 | Mitelman | G06N 3/082 |

(Continued)

OTHER PUBLICATIONS

"Hierarchical Learning for Automated Malware Classification"; Chakraborty et al.; Milcom 2017 Track 3—Cyber Security and Trusted Computing; 2017 (Year: 2017).*

(Continued)

*Primary Examiner* — Benjamin H Elliott, IV
(74) *Attorney, Agent, or Firm* — Womble Bond Dickinson (US) LLP

(57) ABSTRACT

Systems, methods, and related technologies for classification are described. Network traffic transmitted by a first device is obtained. A set of features is determined based on the network traffic. A first classification for the device is determine a first classification for the first device based on the set of features. The first classification is associated with a first classification level. A second machine learning model is identified based on the first classification. The second machine learning model is associated with the first classification. A second classification for the first device is determined based on the second machine learning model. The second classification is associated with a second classification level. At least one of the first classification and the second classification is stored.

17 Claims, 7 Drawing Sheets

(56) References Cited

U.S. PATENT DOCUMENTS

| | | | | |
|---|---|---|---|---|
| 2021/0126833 A1* | 4/2021 | Tedaldi | ............... | H04L 43/0876 |
| 2021/0264025 A1* | 8/2021 | Givental | ............... | G06F 21/577 |
| 2021/0335505 A1* | 10/2021 | Tedaldi | ................ | G06K 9/6282 |
| 2021/0406720 A1* | 12/2021 | Song | ........................ | G06N 5/04 |
| 2022/0210079 A1* | 6/2022 | Koren | ................ | H04L 47/2441 |

OTHER PUBLICATIONS

International Searching Authority, International Search Report and Written Opinion dated Mar. 17, 2022, for International Application No. PCT/US2021/062446.

International Search Report and Written Opinion on the Patentability of Application No. PCT/US2021/062446 dated Mar. 17, 2022, 13 pages.

* cited by examiner

US 11,689,468 B2

DEVICE CLASSIFICATION USING MACHINE LEARNING MODELS

TECHNICAL FIELD

Aspects and implementations of the present disclosure relate to network monitoring, and more specifically, classification of entities of a network.

BACKGROUND

As technology advances, the number and variety of devices or entities that are connected to communications networks are rapidly increasing. Each device or entity may have its own respective vulnerabilities which may leave the network open to compromise or other risks. Preventing the spreading of an infection of a device or entity, or an attack through a network can be important for securing a communication network.

BRIEF DESCRIPTION OF THE DRAWINGS

Aspects and implementations of the present disclosure will be understood more fully from the detailed description given below and from the accompanying drawings of various aspects and implementations of the disclosure, which, however, should not be taken to limit the disclosure to the specific aspects or implementations, but are for explanation and understanding only.

DETAILED DESCRIPTION

Figure 1:
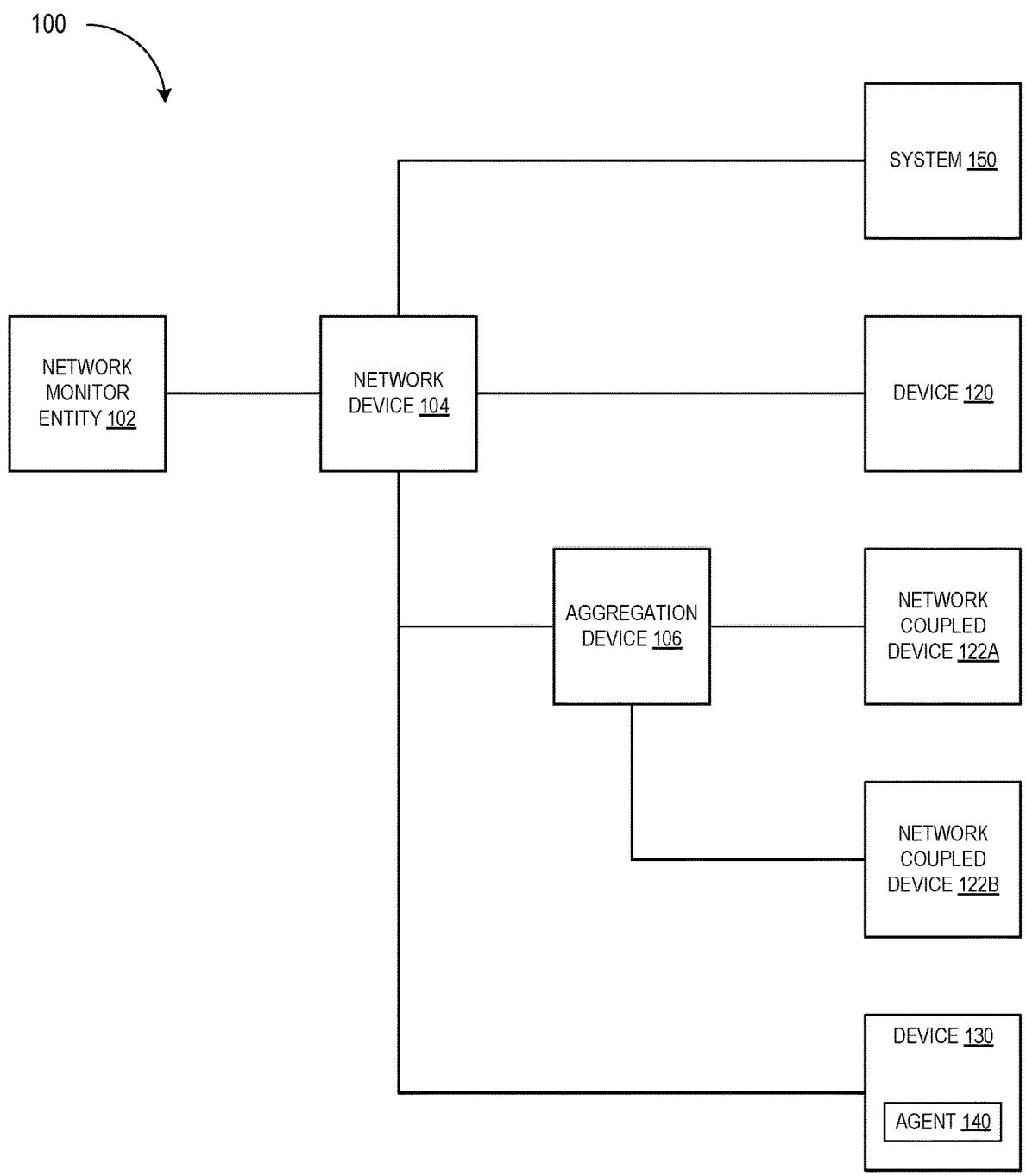
FIG. 1 depicts an illustrative communication network in accordance with one implementation of the present disclosure.

Aspects and implementations of the present disclosure are directed to training and using multiple models (e.g., machine learning models, neural networks, etc.) in series to perform classification of entities of a network (but may be applicable in other areas) at various levels (e.g., granularities). The systems and methods disclosed can be employed with respect to network security, among other fields. More particularly, it can be appreciated that devices or entities with vulnerabilities are a significant and growing problem. At the same time, the proliferation of network-connected devices (e.g., internet of things (IoT) devices such as televisions, security cameras (IP cameras), wearable devices, medical devices, etc.) can make it difficult to effectively ensure that network security is maintained. Classification can be particularly important for securing a network because lack of knowledge about what an entity is can prevent application of appropriate security measures. Accordingly, described herein in various implementations are systems, methods, techniques, and related technologies, which allow for improved classification of entities to enable securing of a network including performing one or more policies based on classification of an entity.

Accordingly, described herein in various implementations are systems, methods, techniques, and related technologies, which enable better classification by using multiple models at varying levels of classifications (e.g., at different hierarchies, granularities, etc.). The usage of multiple models at different levels enables overcoming various problems including improper/incorrect classification of devices or entities, or improper/incorrect classifications of device or entity functions. Embodiments may overcome these problems while improving performance and reducing resources used for classification.

Entity or device visibility becomes more and more important as the number of entities and diversity of entities increases. Detecting or discovering entities in a network is likely not enough to protect the network. With the increasing number and diversity of entities, classification can increasingly need more resources such as storage, processing capabilities, etc. For example, local computing resources may limit or slow usage of increasing complicated and large machine learning (ML) models.

The current profile based classification of known entities may provide classification for approximately 95% function coverage. The benefits of the current profile based classification are accuracy, being deterministic, and human expert knowledge. The limitations of the current profile based classification include labor intensive profile generation to maintain coverage, without a profile match there is no classification of an entity, zero/low tolerance to absence of properties used in a profile, and being difficult to maintain (e.g., conflicts may be introduced when adding profiles to an already large knowledge base).

Machine learning for classification has many benefits including fully automated device/entity classification, potential classification of previously unseen entities, less sensitivity to presence of exact property values, and focused effort to increase coverage. However, a barebones approach where machine learning algorithms are provided with existing information will have limited applicability for real world deployment. This is in part due to a skewed distribution of labels of the training data. For example, training data with a substantially large percentage of information for some types of entities will have trouble accurately predicting classifications for other types of entities.

Previous ML approaches have had several problems. Previous ML approaches ignored imbalanced labels, discrepancies of property distribution, and hierarchical labels. Imbalanced labels are caused by a sample quantity bias. For example, if training data has 100 samples of computers and ten samples of printers, a trained model may be much more likely to predict a computer over a printer. Previous ML approaches are also memory and CPU intensive with large amounts of passing network traffic (e.g., packets, messages, frames, etc.).

The hierarchy of classification labels further add challenges as the current profile approaches which may result in an unknown classifications based on being unable to classify an entity to a fine enough granularity required by a threshold. For example, the current profile approach may require exact matching of properties of an entity to a particular granularity to get above a threshold to classify a result as other than unknown. This means that while classification of a vendor or model of an entity may be unknown, the entity could be classified as at some level (e.g., entity type), which would be actionable and useful to a user.

The hierarchies of the classification labels currently used for classification may also create a challenge. The large numbers of classification labels in the hierarchies results in a universal or single classification model for many granularities of classification will have limited ability to make accurate predictions, especially for rare types of entities. The model training time and memory consumption is also very high with too many unique labels.

Embodiments include a methodology to handle the limitations in the training data and the way the labels are organized for prediction (e.g., by machine learning models). Embodiments may be used with classification taxonomy for devices or entities or more general taxonomies including those that are hierarchical in nature. Embodiments include models trained for multiple levels (e.g., different granularities) thereby allowing more granular classification. Embodiments may be used with hierarchies of labels used for classification (e.g., classifications labels) and with a taxonomy tree that uses taxonomy trees for function, operating system (OS), and vendor. The labels may also be referred to as tags, identifiers, etc. The taxonomy for an operating system may include a particular operating system (e.g., Windows™, Linux, MacOS™, etc.), versions of each operating system, and patch level or service pack level.

Embodiments may use various models organized in a hierarchy where earlier or lower levels of the hierarchy represent more general categories of classification and higher or later levels in the hierarchy represent more specific categories of classification or finer or increased granularity.

Embodiments use multiple models to handle classification at different levels thereby overcoming the limitations of a universal classification model which may have limited ability to make accurate predictions at various granularities. For example, embodiments can increase function and OS classification coverage by accurately predicting unknown entities using machine learning as a supplement to profiles. The models can be custom trained for a particular granularity level of classification to enable more accurate predictions above associated thresholds for the associated granularity.

Embodiments are thus able to break down a large problem of classifying an entity into smaller parts. Each part or layer can be focused on by a particular set of one or more models. In solving each of the smaller parts and in determining a classification for that layer (e.g., granularity layer), embodiments are able to have more flexibility for determining, predicting, or inferring a fine gained classification (e.g., leaf node of a classification tree) of an entity.

Embodiments can thereby focus on various trees of classification with one or more models for each layer of granularity of each tree. A classification tree for function classification can have a top or higher level (e.g., layer, hierarchy, etc.) to represent that an entity can be classified using a first level classification (e.g., a classification associated with the first layer) with respect to function (e.g., entity or device function). A second level of the classification tree can have multiple models for further determining or classifying an entity or device. The models may classify the entity using one or more second level classifications (e.g., classifications associated with the second layer). For example, the models may determine whether an entity is a network device (e.g., switch, router, firewall, access point, etc.), a mobile device (e.g., smartphone, laptop, etc.), a relatively fixed or non-mobile computing device (e.g., a server, a desktop, etc.), a printer, a phone (e.g., voice over internet protocol (VOIP) phone), a scanner, a computer accessory, etc. The second layer of the tree can have a model for determining or classifying whether the entity is a financial device, healthcare device, or industrial device. Embodiments may use a separate model for each layer of the tree or multiple models for a layer. For example, a second layer model for determining or classifying whether an entity is a network device, a mobile device, a fixed device and another second layer model for determining or classifying whether the entity is a financial device, healthcare device, industrial device, a manufacturing device, etc.

Embodiments can thus use multiple models to perform classifications at various or different levels. The classifications for each level may have different granularities. Serial classification decisions (e.g., layers, levels, stages, etc., of classification decisions, stage-wise classification, etc.) may be made thereby allowing better fidelity of classification and control of the classification process. This allows an improvement in classification over traditional classification which can result in lower confidence of classification at increasingly finer grained layers of classification. For example, embodiments may be able to classify an entity as a multimedia device, which can allow one or more polices to be applied, while a more traditional classification methodology may output a very low confidence classification below a threshold that the entity is a smart device (e.g., a smart speaker), which may then not be actionable.

Embodiments further support having a confidence threshold associated with each layer (or granularity) or each model of a layer. For example, for function classification a first layer of granularity may have a threshold of 95% which if met then allows classification at an increased granularity to be determined or inferred. The thresholds for each model may be calibrated during training, user customizable, or any combination thereof. Embodiments thus allow more points of control for ensuring accuracy (e.g., throughout the classification tree). This may allow for stricter (e.g., reduced) false positive rates and false negative rates.

The training of the various models may be based on labeled data that can include entity or device fingerprints, entity or device profile libraries, human expertise, heuristics, labels from users (e.g., where a user enters a classification of an entity), etc. Embodiments may use or select various portions of the labeled data for training models to classify an entity at various levels of granularity. For example, for training a model for classification based on function, the model may be trained with labeled data that is labeled for function. The function labels may be associated with various properties (e.g., DHCP properties, p0f properties, Nmap properties, HTTP user agent, etc.) of an entity that are associated with particular function. As another example, for training an operating system model (e.g., for predicting or classifying an operating system of an entity) data labeled with operating system labels may be used. The OS labels may be associated with various properties (e.g., DHCP properties, p0f properties, Nmap properties, HTTP user agent, etc.) of an entity that are associated with particular operating systems.

Embodiments use serial models (e.g., models that are applied or executed in series, stage-wise models, etc.) which leverages the natural hierarchical label structure to mitigate the problems of imbalanced labels, reduce the number of classes of labels in each stage model, and provide easy to control accuracy/coverage by enabling adjusting output thresholds for each stage. In some embodiments, models in a same stage, hierarchy, or level may operate in parallel. For example, two models in the same stage or level can operate in parallel. The imbalance of labels can originate from labeled data having an imbalance in the number of samples of labeled data. This is caused by an imbalance of the types of entities in many environments. For example, an enterprise may have way more computers than X-ray machines or printers. This creates an imbalance in the data, for instance, 80% of the data is for computers and the remaining 20% is divided among many other different types of entities. Embodiments solve this problem by determining, e.g., with a first model or stage a first level classification of an entity. If an entity can be assigned a first level classification, then the labeled data can be used to further classify the entity at a finer granularity using one or more other models at a later stage or level.

As another example, for operating systems, many enterprises may have a majority of Windows' devices and in comparison relatively few Linux and MacOS™ entities or devices. Embodiments may use a first model to determine whether an entity has a Windows™, Linux, or MacOS™ operating system and the use a second model trained specifically to the operating system determined using the first model to determine the version of the operating system of the entity.

For feature extraction, embodiments can use domain knowledge (e.g., a model customized for classification granularity level) to increase efficiency without losing accuracy. A feature may be one or more properties which when combined represent a feature of an entity. A property may be associated with one or more features. A feature can be a keyword or a keyword count. A feature may be a set of distinguishing characteristics for each class of an entity. The domain knowledge can include keywords (e.g., select or predefined keywords) that have been determined to be useful for classification (e.g., by a researcher, profiles, models, etc.). For example, keywords may be used to select property values from an Nmap string associated with one or more entities. In some embodiments, keyword counts may also be used as data for training classification models and classifying entities. This allows selection of information that is relevant to classification and putting it in numerical form which can then be used for training (e.g., of a model). The use of domain knowledge can thus refine the data that is used (e.g., provided to a model) for training a classification model and the data used for performing a classification.

Embodiments may use one or more optimization techniques to use fewer or selected properties while increasing efficiency without losing accuracy. The optimization techniques can include training a model on the properties available in an unknown set of entities. The known set of devices or entities is a set of entities where enough properties (e.g., as property key value pairs) are available for classifying the entities. The set of unknown entities may have fewer properties or less relevant properties available as compared to the known set. For example, a known set of entities will likely have more available properties (e.g., user agent, open ports, data from switches or other network infrastructure, Nmap, DHCP, MAC address, DNS, etc.) than an unknown set of entities (e.g., which might have MAC address and vendor while not having Nmap, DHCP, and DNS properties). As another example, if a set of known entities has 7-10 properties available, an unknown set of entities may have one, two, or three properties available. Embodiments may train a model at a granularity level based on data from the known set of entities. For example, a model at a particular granularity level may be trained based on properties that are more readily available in the unknown set. The training of the model based on the more available properties in the unknown sets enables models trained by embodiments to provide classification where prior classification methodologies are not able to provide classifications (e.g., due to bias caused by training only on the known set). Embodiments are well suited for using real data, including properties available in the unknown set, thereby reducing bias because the models and classifications from the models trained by embodiments have been trained on properties available in the unknown set. This can further accelerate development of models by yielding better results. Embodiments thus use both real known and unknown samples to get less biased results. In some embodiments, the classification may further be based on additional information (e.g., external data from one or more webpages from the Internet).

Using prior best effort classification for predicting an entity, there is no control for the user to decide what granularity an entity is classified to depending on an accuracy threshold. For example, a prior best effort approach may result in unknowns because the model does not support predictions at a level of granularity beyond the granularity the model was trained for. In other words, when a model at the second layer has only seen three types of networking entities but is presented with a fourth type, it will likely predict one of the three types that it has seen resulting in an inaccurate prediction. Embodiments overcome this by training models using an unknown set. This training allows the model to effectively have another classification instead of being biased toward determining a classification of the classifications in the labeled data. For example, if the labeled data includes three types of networking entities, then a model trained on that data will likely be biased to determine a classification as one of the three types of networking entities in the labeled data. This can include classifying a fourth type of network entity as one of the three types of entities in the labeled data. The use of the unknown or other classifications allows embodiments to train a model that is less or not biased toward the classifications of the labeled data.

Embodiments have better resource utilization including reduced memory and processing (e.g., central processing unit (CPU) or graphics processing unit (GPU)) resource consumption and less message passing. The use of models at increasing finer granularities means that more specific models are used with fewer properties and more specific sets of labeled data. The use of more specialized models uses less processing resources and uses less memory for training, classification, or a combination thereof. In some embodiments, a smaller number of features or a smaller number of high impact features are used in training of a model and for classification. The specialized models used by embodiments may use a smaller number of features as compared to more general models. Embodiments may thus use a smaller number of properties featurized in a unique way to enable better classification.

The use of more specialized or finer granularity models (e.g., models at different stages, or levels) further allows a reduced amount of message passing between cores of a processor (e.g., CPU or GPU) due to the models being simpler and the amount of training data being more specialized and thereby smaller (e.g., due to training to be a finer grain model). Embodiments can thus reduce hardware or compute requirements due to reducing processing and memory resources used and reduce the amount of message passing (e.g., message passing between cores of a CPU or GPU) for training and classification.

Embodiments advantageously enable benefits including higher accuracy and higher confidence classifications using models configured for classification at various granularities. Embodiments advantageously use level/stage based or increasing granularity classification models to overcome issues of imbalanced labels, discrepancies in property distribution, and hierarchical labels. The level/stage based classification models consume less resources (e.g., processing and memory) than a single universal classification model. The level/stage based models may be configurable to have a threshold (e.g., confidence threshold) set for each level or granularity to allow accuracy at multiple levels of granularity. The level/stage based models further enable the flexibility of customized classification granularity based on a user's configuration (e.g., based on a user configuring one or more confidence thresholds). For example, confidence thresholds at each level of granularity may be configured (e.g., during training, by a user, or a combination thereof).

Accordingly, described herein in various implementations are systems, methods, techniques, and related technologies, which may perform classification, training of models for classification, or a combination thereof. As described herein, various techniques can be used to perform classification at various levels of granularity and train models for use in classification at various levels of granularity.

It can be appreciated that the described technologies are directed to and address specific technical challenges and longstanding deficiencies in multiple technical areas, including but not limited to network security, monitoring, and policy enforcement. It can be further appreciated that the described technologies provide specific, technical solutions to the referenced technical challenges and unmet needs in the referenced technical fields.

Network segmentation can be used to enforce security policies on a network, for instance in large and medium organizations, by restricting portions or areas of a network which an entity can access or communicate with. Segmentation or "zoning" can provide effective controls to limit movement across the network (e.g., by a hacker or malicious software). Enforcement points including firewalls, routers, switches, cloud infrastructure, other network devices/entities, etc., may be used to enforce segmentation on a network (and different address subnets may be used for each segment). Enforcement points may enforce segmentation by filtering or dropping packets according to the network segmentation policies/rules. The viability of a network segmentation project depends on the quality of visibility the organization has into its entities and the amount of work or labor involved in configuring network entities.

An entity or entities, as discussed herein, include devices (e.g., computer systems, for instance laptops, desktops, servers, mobile devices, IoT devices, OT devices, etc.), endpoints, virtual machines, services, serverless services (e.g., cloud based services), containers (e.g., user-space instances that work with an operating system featuring a kernel that allows the existence of multiple isolated user-space instances), cloud based storage, accounts, and users. Depending on the entity, an entity may have an IP address (e.g., a device) or may be without an IP address (e.g., a serverless service). Embodiments are able to dynamically (e.g., on the fly or responsive to changing conditions, for instance, an entity being communicatively coupled to a network or in response to determination of characteristics of an entity) control access of various entities or micro-segment various entities, as described herein.

The enforcement points may be one or more network entities (e.g., firewalls, routers, switches, virtual switch, hypervisor, SDN controller, virtual firewall, etc.) that are able to enforce access or other rules, ACLs, or the like to control (e.g., allow or deny) communication and network traffic (e.g., including dropping packets) between the entity and one or more other entities communicatively coupled to a network. Access rules may control whether an entity can communicate with other entities in a variety of ways including, but not limited to, blocking communications (e.g., dropping packets sent to one or more particular entities), allowing communication between particular entities (e.g., a desktop and a printer), allowing communication on particular ports, etc. It is appreciated that an enforcement point may be any entity that is capable of filtering, controlling, restricting, or the like communication or access on a network.

FIG. 1 depicts an illustrative communication network 100, in accordance with one implementation of the present disclosure. The communication network 100 includes a network monitor entity 102, a network device 104, an aggregation device 106, a system 150, devices 120 and 130, and network coupled devices 122a-b. The devices 120 and 130 and network coupled devices 122a-b may be any of a variety of devices including, but not limited to, computing systems, laptops, smartphones, servers, Internet of Things (IoT) or smart devices, supervisory control and data acquisition (SCADA) devices, operational technology (OT) devices, campus devices, data center devices, edge devices, etc. It is noted that the devices/entities of communication network 100 may communicate in a variety of ways including wired and wireless connections and may use one or more of a variety of protocols.

Network device 104 may be one or more network entities configured to facilitate communication among aggregation device 106, system 150, network monitor entity 102, devices 120 and 130, and network coupled devices 122a-b. Network device 104 may be one or more network switches, access points, routers, firewalls, hubs, etc.

Network monitor entity 102 may be operable for a variety of tasks including determining one or more properties, one or more classifications at various granularities, security actions, as described herein. Network monitor entity 102 can perform the classification using one or more models each with an associated level (e.g., granularity) to provide more efficient and accurate classification. A confidence may be determined with each classification and compared with a threshold (e.g., confidence threshold) associated with the model to determine if further another classification (e.g., at another level of granularity) should be determined. In some embodiments, network monitor entity 102 can use local resources (e.g., processing, memory, data resources, or other resources), cloud resources, or a combination thereof for performing the classifications. In various embodiments, the classifications from one or more models may be combined with one or more classifications based on a profiles, fingerprints, etc., as described herein.

Network monitor entity 102 may further train the one or more models for use in determining or inferring the one or more classifications. Each model may be trained on a select data set (e.g., training data, etc.) to classify a device or entity at a granularity level, as described herein. The trained models may be deployed locally, in the cloud, or a combination thereof for classification by one or more network monitor entities.

Network monitor entity 102 can determine one or more enforcement points where the entity is communicatively coupled to the network and thereby determine the one or more enforcement points closest to the entity. For example, network monitor entity 102 may access information on a switch (e.g., a switch cache) to determine a port (e.g., physical port, wireless port, or virtual port) where an entity with a particular IP address or MAC address or other identifier is communicatively coupled. Network monitor entity 102 may also access information from a wireless access point where the entity is communicatively coupled. In some embodiments, network monitor entity 102 may poll information from a cloud service to determine where an entity is communicatively coupled or connected to a network. In various embodiments, network monitor entity 102 access syslog or SNMP information from an entity itself to determine where an entity is communicatively coupled or connected to a network (e.g., without accessing information from a network entity or enforcement point). Network monitor entity 102 supports applying access policies in situations where an entity is communicatively coupled to a network with more than one connection (e.g., a wired connection and a wireless connection).

Based on the enforcement point, network monitor entity 102 determines the one or more access rules to be assigned to the one or more enforcement points based on an access policy. In some embodiments, based on information about the one or more enforcement points closest to the entity, network monitor entity 102 translates the access policy into one or more commands that will be used to configure the access rules on the one or more enforcement points. The closest enforcement point to an entity can be enforcement point where the entity is communicatively coupled. The enforcement point may be network entity or network infrastructure device closest in proximity (e.g., physical proximity) to the entity. The enforcement point comprises the port where the entity is communitive coupled to the network, and communication to and from the entity is sent first through that port. In some embodiments, the port of the enforcement point is the last point of communication within network infrastructure before communication is sent to the entity. In various embodiments, the closest enforcement point is where communication from the entity is initially sent when communications are sent from the entity (e.g., prior to communications with the network backbone or Internet backbone). For example, the closest enforcement to an entity connected to a switch is the switch. As another example, the closest enforcement point to an entity wirelessly communicatively coupled to a wireless access point is wireless access point. In various embodiments, network monitor entity 102 may access the current configuration of the one or more enforcement points to determine the access rules (e.g., ACLs) that are to be applied to the one or more enforcement points, as described herein. In some embodiments, an entity is communicatively coupled to a wireless controller via a wireless access point and the wireless controller or a switch is the closest enforcement point (e.g., based on the wireless controller or the switch being able to apply access rules, for instance ACLs, to communications of the entity, for instance, in the case where the wireless access point is not able to or does not have the functionality to apply access rules). In various embodiments, an entity is communicatively coupled to a layer 3 switch via a layer 2 switch and the layer 3 switch is the closest enforcement point (e.g., based on the layer 3 switch being able to apply access rules, for instance ACLs, to communications of the entity, for instance, in the case where the layer 2 switch is not able to or does not have the functionality to apply access rules).

Network monitor entity 102 may then apply or assign the access rules to the one or more enforcement points closest to the entity. Network monitor entity 102 may communicate the access rules via application programming interfaces (APIs), command line interface (CLI) commands, Web interface, simple network management protocol (SNMP) interface, etc. In some embodiments, network monitor entity 102 may verify that the one or more enforcement points have been properly or correctly configured based on the access rules.

Network monitor entity 102 may provide an interface (e.g., a graphical user interface (GUI)) for viewing, monitoring, and modifying classification or associated thresholds associated one or more models, as described herein. Network monitor entity 102 may further monitor network traffic over time to reclassify entities as new entities join the network, entities rejoin the network, and new models are made available.

Network monitor entity 102 may further perform a variety of operations including identification, classification, and taking one or more remediation actions (e.g., changing network access of an entity, changing the virtual local area network (VLAN), sending an email, sending a short message service (SMS) message, etc.).

An enforcement point may be a router, firewall, switch, hypervisor, software-defined networking (SDN) controller, virtual firewall, or other network entity or infrastructure that may have an ACL like or rule like policy or functionality to apply based on the port where an entity is communicatively coupled thereto. Enforcements points may also be a next generation firewall (NGFW) and cloud infrastructure. A NGFW can be updated with an ACL like policy regarding an entity accessing the Internet. Cloud infrastructure (e.g., amazon web services (AWS) security groups) can be updated to drop packets from the IP of the entity that have a destination outside the cloud. Embodiments are operable to configure enforcement points at the edge of a network where an entity is communicatively coupled thereto thereby controlling access of the device on a customized basis (e.g., customized or tailored for the entity).

In some embodiments, if the categorization or characteristics functionality is being updated (e.g., which could result in a change in one or more access rules that are assigned to an enforcement point closest an entity and thus impact the enforcement of an access policy by the enforcement points), notifications may be sent (e.g., via email or other methods as described herein) or presented to a user (e.g., via a graphical user interface (GUI)) to indicate that the categorization or characteristics of one or more entities is changing and should be confirmed before one or more enforcement points are updated based on the changed categorization or characteristics. After conformation, the access rules may be changed.

Network monitor entity 102 may be a computing system, network device (e.g., router, firewall, an access point), network access control (NAC) device, intrusion prevention system (IPS), intrusion detection system (IDS), deception device, cloud-based device, virtual machine based system, etc. Network monitor entity 102 may be communicatively coupled to the network device 104 in such a way as to receive network traffic flowing through the network device 104 (e.g., port mirroring, sniffing, acting as a proxy, passive monitoring, etc.). In some embodiments, network monitor entity 102 may include one or more of the aforementioned devices. In various embodiments, network monitor entity 102 may further support high availability and disaster recovery (e.g., via one or more redundant devices).

In some embodiments, network monitor entity 102 may monitor a variety of protocols (e.g., Samba, hypertext transfer protocol (HTTP), secure shell (SSH), file transfer protocol (FTP), transfer control protocol/internet protocol (TCP/IP), user datagram protocol (UDP), Telnet, HTTP over secure sockets layer/transport layer security (SSL/TLS), server message block (SMB), point-to-point protocol (PPP), remote desktop protocol (RDP), windows management instrumentation (WMI), windows remote management (WinRM), etc.).

The monitoring of entities by network monitor entity 102 may be based on a combination of one or more pieces of information including traffic analysis, information from external or remote systems (e.g., system 150), communication (e.g., querying) with an aggregation device (e.g., aggregation device 106), and querying the device itself (e.g., via an API, CLI, web interface, SNMP, etc.), which are described further herein. Network monitor entity 102 may be operable to use one or more APIs to communicate with aggregation device 106, device 120, device 130, or system 150. Network monitor entity 102 may monitor for or scan for entities that are communicatively coupled to a network via a NAT device (e.g., firewall, router, etc.) dynamically, periodically, or a combination thereof.

Information from one or more external or 3$^{rd}$ party systems (e.g., system 150) may further be used for determining one or more tags or characteristics for an entity. For example, a vulnerability assessment (VA) system may be queried to verify or check if an entity is in compliance and provide that information to network monitor entity 102. External or 3$^{rd}$ party systems may also be used to perform a scan or a check on an entity to determine a software version.

Device 130 can include agent 140. The agent 140 may be a hardware component, software component, or some combination thereof configured to gather information associated with device 130 and send that information to network monitor entity 102. The information can include the operating system, version, patch level, firmware version, serial number, vendor (e.g., manufacturer), model, asset tag, software executing on an entity (e.g., anti-virus software, malware detection software, office applications, web browser(s), communication applications, etc.), services that are active or configured on the entity, ports that are open or that the entity is configured to communicate with (e.g., associated with services running on the entity), media access control (MAC) address, processor utilization, unique identifiers, computer name, account access activity, etc. The agent 140 may be configured to provide different levels and pieces of information based on device 130 and the information available to agent 140 from device 130. Agent 140 may be able to store logs of information associated with device 130. Network monitor device 102 may utilize agent information from the agent 140. While network monitor entity 102 may be able to receive information from agent 140, installation or execution of agent 140 on many entities may not be possible, e.g., IoT or smart devices.

System 150 may be one or more external, remote, or third party systems (e.g., separate) from network monitor entity 102 and may have information about devices 120 and 130 and network coupled devices 122a-b. System 150 may include a vulnerability assessment (VA) system, a threat detection (TD) system, endpoint management system, a mobile device management (MDM) system, a firewall (FW) system, a switch system, an access point system, etc. Network monitor entity 102 may be configured to communicate with system 150 to obtain information about devices 120 and 130 and network coupled devices 122a-b on a periodic basis, as described herein. For example, system 150 may be a vulnerability assessment system configured to determine if device 120 has a computer virus or other indicator of compromise (IOC).

The vulnerability assessment (VA) system may be configured to identify, quantify, and prioritize (e.g., rank) the vulnerabilities of an entity. The VA system may be able to catalog assets and capabilities or resources of an entity, assign a quantifiable value (or at least rank order) and importance to the resources, and identify the vulnerabilities or potential threats of each resource. The VA system may provide the aforementioned information for use by network monitor entity 102.

The advanced threat detection (ATD) or threat detection (TD) system may be configured to examine communications that other security controls have allowed to pass. The ATD system may provide information about an entity including, but not limited to, source reputation, executable analysis, and threat-level protocols analysis. The ATD system may thus report if a suspicious file has been downloaded to an entity being monitored by network monitor entity 102.

Endpoint management systems can include anti-virus systems (e.g., servers, cloud based systems, etc.), next-generation antivirus (NGAV) systems, endpoint detection and response (EDR) software or systems (e.g., software that record endpoint-system-level behaviors and events), compliance monitoring software (e.g., checking frequently for compliance).

The mobile device management (MDM) system may be configured for administration of mobile devices, e.g., smartphones, tablet computers, laptops, and desktop computers. The MDM system may provide information about mobile devices managed by MDM system including operating system, applications (e.g., running, present, or both), data, and configuration settings of the mobile devices and activity monitoring. The MDM system may be used get detailed mobile device information which can then be used for device monitoring (e.g., including device communications) by network monitor entity 102.

The firewall (FW) system may be configured to monitor and control incoming and outgoing network traffic (e.g., based on security rules). The FW system may provide information about an entity being monitored including attempts to violate security rules (e.g., unpermitted account access across segments) and network traffic of the entity being monitored.

The switch or access point (AP) system may be any of a variety of network entities (e.g., network device 104 or aggregation device 106) including a network switch or an access point, e.g., a wireless access point, or combination thereof that is configured to provide an entity access to a network. For example, the switch or AP system may provide MAC address information, address resolution protocol (ARP) table information, device naming information, traffic data, etc., to network monitor entity 102 which may be used to monitor entities and control network access of one or more entities. The switch or AP system may have one or more interfaces for communicating with IoT or smart devices or other entities (e.g., ZigBee™, Bluetooth™, etc.), as described herein. The VA system, ATD system, and FW system may thus be accessed to get vulnerabilities, threats, and user information of an entity being monitored in real-time which can then be used to determine a risk level of the entity.

Aggregation device 106 may be configured to communicate with network coupled devices 122a-b and provide network access to network coupled devices 122a-b. Aggregation device 106 may further be configured to provide information (e.g., operating system, device software information, device software versions, device names, application present, running, or both, vulnerabilities, patch level, etc.) to network monitor entity 102 about the network coupled devices 122a-b. Aggregation device 106 may be a wireless access point that is configured to communicate with a wide variety of entities through multiple technology standards or protocols including, but not limited to, Bluetooth™, Wi-Fi™, ZigBee™, Radio-frequency identification (RFID), Light Fidelity (Li-Fi), Z-Wave, Thread, Long Term Evolution (LTE), Wi-Fi™ HaLow, HomePlug, Multimedia over Coax Alliance (MoCA), and Ethernet. For example, aggregation device 106 may be coupled to the network device 104 via an Ethernet connection and coupled to network coupled devices 122a-b via a wireless connection. Aggregation device 106 may be configured to communicate with network coupled devices 122a-b using a standard protocol with proprietary extensions or modifications.

Aggregation device 106 may further provide log information of activity and properties of network coupled devices 122a-b to network monitor entity 102. It is appreciated that log information may be particularly reliable for stable network environments (e.g., where the types of entities on the network do not change often). The log information may include information of updates of software of network coupled devices 122a-b.

Figure 2:
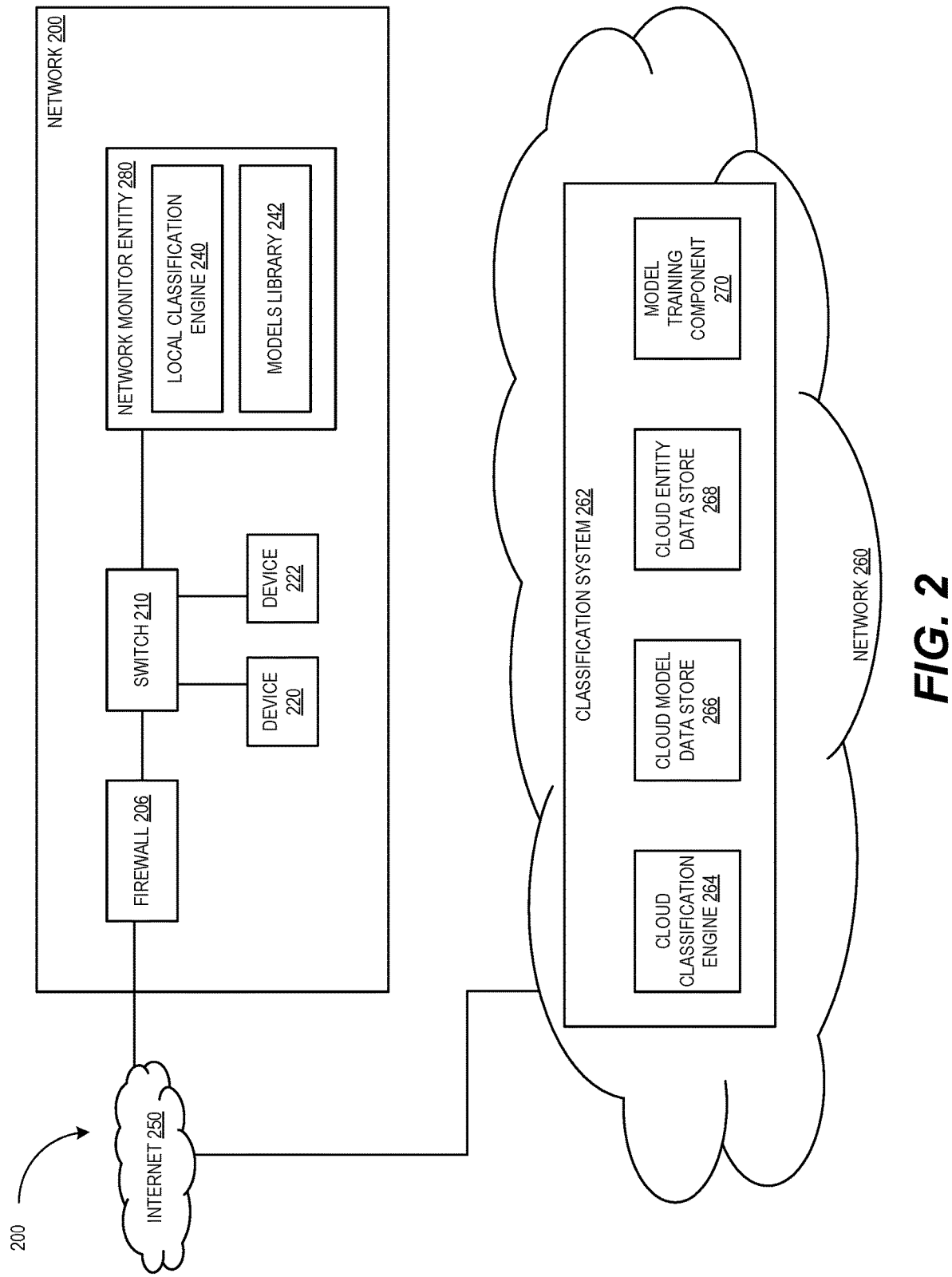
FIG. 2 depicts an illustrative network topology in accordance with one implementation of the present disclosure.

FIG. 2 depicts an illustrative network topology in accordance with one implementation of the present disclosure. FIG. 2 depicts an example network 200 with multiple enforcement points (e.g., firewall 206 and switch 210) and a network monitor entity 280 (e.g., network monitor entity 102) which can perform or determine one or more classifications, as described herein, associated with the various entities communicatively coupled in example network 200. Network monitor entity 280 may further perform training of one or more models for use in classification, as described herein.

Classification system 262 may be a cloud classification system operable to perform classification of an entity at multiple granularities, as described herein. In some embodiments, classification system 262 may be part of a larger system operable to perform a variety of functions, e.g., part of a cloud based network monitor entity, security device, etc. Classification system 262 may further be operable to train one or more models at various granularities, as described herein. Example components are shown of network monitor entity 280 and classification system 262 and other components may be present or included.

FIG. 2 shows example devices 220-222 (e.g., devices 106, 122a-b, 120, and 130, other physical or virtual devices, other entities, etc.) and it is appreciated that more or fewer network entities or other entities may be used in place of the devices of FIG. 2. Example devices 220-222 may be any of a variety of devices or entities (e.g., smart devices, multimedia devices, networking devices, accessories, mobile devices, IoT devices, retail devices, healthcare devices, etc.), as described herein. Enforcement points including firewall 206 and switch 210 may be any device (e.g., network device 104, cloud infrastructure, etc.) that is operable to allow traffic to pass, drop packets, restrict traffic, etc. Network monitor entity 280 may be any of a variety of network devices or entities, e.g., router, firewall, an access point, network access control (NAC) device, intrusion prevention system (IPS), intrusion detection system (IDS), deception device, cloud-based entity or device, virtual machine based system, etc. Network monitor entity 280 may be substantially similar to network monitor entity 102. Embodiments support IPv4, IPv6, and other addressing schemes. In some embodiments, network monitor entity 280 may be communicatively coupled with firewall 206 and switch 210 through additional individual connections (e.g., to receive or monitor network traffic through firewall 206 and switch 210).

Switch 210 communicatively couples the various entities of network 200 including firewall 206, network monitor entity 280, and devices 220-222. Firewall 206 may perform network address translation (NAT). Firewall 206 communicatively couples network 200 to Internet 250 and firewall 206 may restrict or allow access to Internet 250 based on particular rules or ACLs configured on firewall 206. Firewall 206 and switch 210 are enforcement points, as described herein.

Network monitor entity 280 can access network traffic from network 200 (e.g., via port mirroring or SPAN ports of firewall 206 and switch 210 or other methods). Network monitor entity 280 can perform passive scanning of network traffic by observing and accessing portions of packets from the network traffic of network 200. Network monitor entity 280 may perform an active scan of an entity of network 200 by sending one or more requests to the entity of network 200. The information from passive and active scans of entities of network 200 can be used to determine one or more properties associated with the entities of network 200.

Network monitor entity 280 includes local classification engine 240 which may perform classification of the entities of network 200 including firewall 206, switch 210, and devices 220-222. Network monitor entity 280 further includes models library 242 which includes models of various granularities and thresholds (e.g., confidence thresholds) associated with the models. The models of models library 242 may have been trained locally (e.g., by network monitor entity 280), in the cloud (e.g., by classification system 262), or a combination thereof. In some embodiments, the thresholds may be customized based on user input, configured in association with training, or a combination thereof, as described herein. Local classification engine 240 may perform classification (e.g., blocks of flowchart 400) of the entities of network 200 using one or more models of models library 242. In some embodiments, the use of various models at various granularities may enhance classification that is otherwise limited by active scans not being available in an environment (e.g., an environment with entities that are sensitive to or not able to handle active scanning).

Local classification engine 240 can send data (e.g., property values) about entities of network 200, as determined by local classification engine 240, to classification system 262. Local classification engine 240 may encode and encrypt the data prior to sending the data to classification system 262. In some embodiments, local classification engine 240 checks the confidence and granularity of each classification and communicates with classification system 262 data to perform a classification where at least one of a granularity threshold or a confidence threshold are not met. Local classification engine 240 may receive a classification from classification system 262 which network monitor entity 280 can use to perform various security related measures. In some embodiments, classification of an entity may be performed in part by local network monitor entity 280 (e.g., local classification engine 240) and in part by classification system 262.

Classification system 262 can perform a cloud based classification, as described herein. In some embodiments, classification system 262 includes cloud classification engine 264, cloud model data store 266, cloud entity data store 268, and model training component 270.

Cloud classification engine 264 may perform classification (e.g., blocks of flowchart 400) based on data received from network monitor entity 280 (e.g., based features determined using properties of an entity), as described herein. Cloud classification engine 264 may unencrypt and decode the information received prior to performing a classification. Cloud classification engine 264 may use cloud model data store 266 in determining a classification based on one or more models associated with various granularities. A classification determined by cloud classification engine 264 can be sent back to network monitor entity 280.

Cloud model data store 266 is model data store (e.g., a cloud model database) with each model associated with a level (e.g., granularity), as described herein. Cloud profile data store 266 is not subject to the resource conditions or limitations (e.g., processing power, storage, etc.) that may impact network monitor entity 280 (e.g., and local classification engine 240). Cloud entity data store 268 is a data store (e.g., a cloud entity database) of entity information that has been uploaded to classification system 262. For example, the data in cloud entity data store 268 may include entity or device name, operating system, function, vendor/model, and host information from a variety of networks (e.g., that have network monitor entities configured to upload device information).

Model training component 270 is configured to train one or more models at various levels (e.g., blocks of flowchart 500), as described herein. The data of cloud entity data store 268 may be used by model training component 270 to train one or more models at various granularity levels, as described herein. Cloud entity data store 268 may be used to train one or more of the models of cloud model data store 266. Model training component 270 may further evaluate models and determine respective confidence thresholds associated with each model, as described herein.

Both local classification engine 240 and cloud classification engine 264 may use profile based classification along with other classification methods in conjunction with classifications based on various models associated with various levels.

Figure 3:
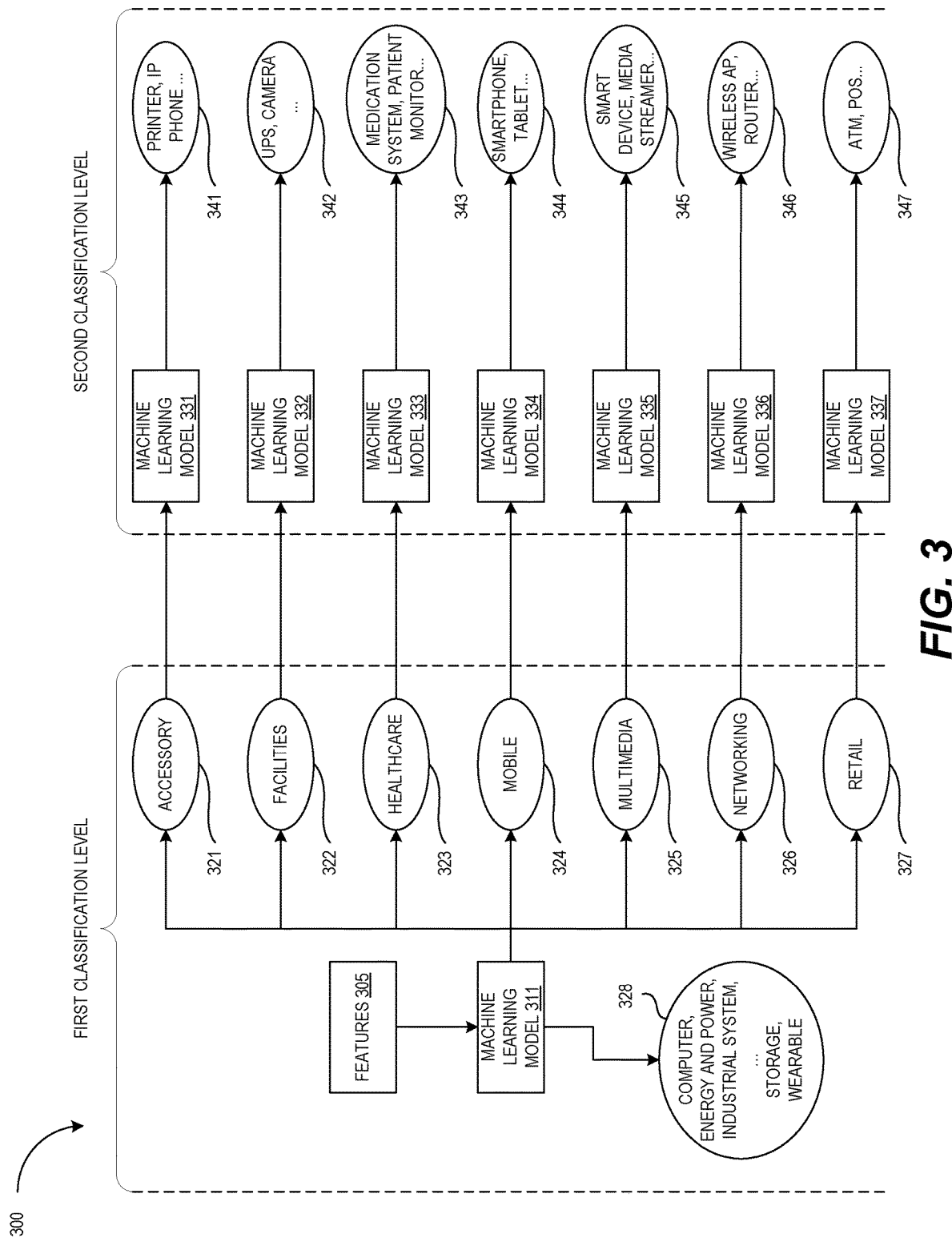
FIG. 3 depicts a diagram of aspects of classification using multiple models in accordance with one implementation of the present disclosure.

FIG. 3 depicts a diagram of aspects of classification using multiple machine learning models (e.g., multiple levels, stages, layers, tiers, hierarchies, etc., of machine learning models) in accordance with one implementation of the present disclosure. FIG. 3 depicts an example tree 300 with various models (e.g., machine learning models) at various levels, stages, layers, granularities, etc. The different machine learning models at each level allows for different granularities of classification and higher confidence classifications because the machine learning models are trained to perform classification at a particular granularity.

Example tree 300 depicts an example classification tree for function classification in accordance with some embodiments. The tree 300 includes machine learning model 311, machine learning model 331, machine learning model 332, machine learning model 333, machine learning model 334, machine learning model 335, machine learning model 336, and machine learning model 331. The tree 300 also includes classifications 321 through 328 and classifications 341 through 347.

As illustrated in FIG. 3, machine learning model 311 and classifications 321-328 are associated with or part of a first classification level. The classifications 321 through 328 may be classifications of entity at a first granularity. For example, each classification 321 through 328 may represent or indicate a type, category, group, division, of devices or entities. The classifications 321 through 328 may be generated, determined, calculated, outputted, etc., by the machine learning model 311. Machine learning models 331 through 337 and classifications 341 through 347 are associated with or part of a second classification level. The classifications 341 through 347 may be classifications of entity at a second granularity. The classifications 341 through 347 may further define, refine, narrow, etc., the type, category, group, division, of the devices or entities. For example, the classification 341 may indicate a subtype, subcategory, subdivision, etc., of entities that are part of classification 321. The classifications 341 through 347 may be generated, determined, calculated, outputted, etc., by the machine learning models 331 through 337. As illustrated in FIG. 3, classification 328 is not associated with a machine learning model in the second classification level. If an entity is classified with classification 328 (e.g., as a storage device, as a wearable device, etc.), a second level classification may not be performed.

The various models of tree 300 (e.g., machine learning models 311 and 331 through 337) may be trained according to embodiments disclosed herein (e.g., blocks of flowchart 500). In one embodiment, the different machine learning models 311 and 331 through 337 may be trained using one or more of different training processes and different training data. For example, a first set of training data may be used to train machine learning model 311, a second (e.g., different) set of training data may be used to train machine learning model 331, etc. This may allow for the machine learning models 311 and 331 through 337 to be tailored for different levels or granularities. The classifications (e.g., 321 through 328 and 341 through 347) can be determined or inferred according to embodiments described herein (e.g., blocks of flowchart 400).

Various portions of tree 300 may be performed by different components (e.g., components of system 600) of a device or entity (e.g., network monitor entity 102 or network monitor entity 280). For example, different machine learning models may be executed by different components of a device or entity (e.g., machine learning model 311 may be executed by a first component, machine learning model 331 may be executed by a second component, etc.).

In one embodiment, the features 305 may include one or more of textual features (e.g., text, descriptions, identifiers, labels, tags, etc.) and fingerprints associated with an entity. The features 305 may be determined (e.g., generated, calculated, identified, etc.) based on network data transmitted by the entity. For example, the features 305 may be determined based on properties of the entity. These properties may include data or values extracted from network traffic (e.g., packets) transmitted by or sent to the entity. For example, one or more properties and property values may be extracted or accessed based on one or more keywords or variables associated with portions of a packet, protocol fields, etc. The properties may be featurized (e.g., converted to a different format, value, etc.) to generate the features 305. The features 305 may include a vector where each element of the vector represents or is associated with a particular property or a value for the property. For example, an element of the vector may be 1 (e.g., true) or 0 (e.g., false) and the element may represent whether an entity has network access translation (NAT) properties. In another example, an element of the vector may include or represent an IP address for an entity. In a further example, an element of the vector may include a representation of a fingerprint of an entity (e.g., a DHCP fingerprint, a device fingerprint, etc.). The fingerprint of the entity may be determined by analyzing the network traffic of the entity. For example, a DHCP fingerprint for the entity may be determined by analyzing DHCP traffic (e.g., DHCP packets or message) transmitted by the entity. The features 305 (e.g., the vector) may be provided to the machine learning model 311 as an input.

Machine learning model 311 may be trained to determine a first classification (e.g., a first level classification) for an entity based on the features 305 (e.g., based on one or more properties) associated with the entity. The first classification may be one of classifications 321 through 328. The machine learning model 311 may take the features 305 as input and may generate an output indicating one of the classifications 321 through 328. As described herein, the network data (e.g., properties of the network data, fields or values of fields in the network data, etc.) may be featurized before being provided to the machine learning model 311 as input. For example, features 305 may be generated based on the network data.

Machine learning model 311 may be associated with a threshold confidence level that is compared against a confidence level associated the classification generated by the machine learning model 311. For example, the machine learning model 311 may generate an output that indicates a confidence level for each of the classifications 321 through 328. If the confidence levels associated each of the classifications 321 through 328 is below the threshold confidence level associated with machine learning model 311, the entity may be determined to be unclassified (e.g., having a classification of unknown, having an unknown classification, etc.). If the confidence associated one or more of the classifications 321 through 327 is above the threshold confidence level associated with machine learning model 311, then the machine learning model corresponding to the one or more classifications may be used for further classification of the entity.

For example, machine learning model 311 may classify an entity as an accessory device with 2% confidence, as a facilities device with 5% confidence, as a healthcare device with 0% confidence, as a mobile device with 90% confidence, as a multimedia device with 75% confidence, as a network device with 50% confidence, and as a retail device with 10% confidence. If the threshold associated with machine learning model 311 is 70% then embodiments may use one or more of machine learning models 334 and 335 to further predict, infer, or determine additional classifications of the entity as a network device, mobile device, computer device, etc. For example, the machine learning model associated with the classification that has the highest confidence level (that is above the threshold confidence level) may be identified or selected. In another example, the machine learning models associated with the top two, three, or some other appropriate number of highest confidence levels (that is above the threshold confidence level) may be identified or selected. Embodiments thus support using thresholds to determine whether to continue using higher level (e.g., finer grain) models to further classify an entity or entity at a finer granularity.

Machine learning models 331 through 337 may each be associated with a threshold confidence level that is compared against a confidence level associated the classification generated by the machine learning models 331 through 337. The machine learning model 331 may generate an output that indicates a confidence level for each of the possible classifications 341 through 347. For example, printer, IP phone, scanner, etc., may each be possible classifications for an entity (e.g., possible classifications 341) determined by the machine learning model 331. The machine learning model 331 may generate a confidence level for each of the classifications, printer, IP phone, scanner, etc. If the confidence levels associated with each of classifications generated by the machine learning model 331 are each below the threshold confidence level associated with machine learning model 311, the entity may be determined to be unclassified (e.g., having a classification of unknown) at the second classification level. If the confidence levels associated with one or more of the classifications is above the threshold confidence level (associated with machine learning model 311), then the entity may be determined to be classified as one or more of those classifications (e.g., classifications 341-347).

For example, machine learning model 331 may classify an entity as a printer with 80% confidence, as a scanner with 85% confidence, as an IP phone with 15% confidence, etc. If the threshold associated with machine learning model 311 is 75% then embodiments may further classify the entity as one or more of a scanner and a printer. For example, the classification that has the highest confidence level (that is above the threshold confidence level) may be selected. In another example, the classifications that have the highest two, three, etc., confidence levels (that are above the threshold confidence level) may be selected. Embodiments thus support using thresholds to determine whether a higher level classification (e.g., a classification with higher or more granularity) may be determined for a device or entity.

In some embodiments, the features 305 or a subset of the features 305 may be provided to one or more of the machine learning models 331 through 337 for further classification of a device or entity. For example, after the machine learning model 311 determines one or more of the classifications 321 through 327 for an entity, the features 305 or a subset of the features 305 may be provided to the machine learning models associated with the classifications (e.g., to machine learning model 331 for classification 321, to machine learning model 332 for classification 322, etc.). For example, the features 305 may be used by the machine learning model to determine that a classification 324 (e.g., mobile) should be applied to an entity. The features 305 or a subset of the features 305 may be provided as an input to the machine learning model 334 (which is associated with the classification 324). For example, not all of the features may be relevant or used (e.g., selected) by the machine learning model 334. The features that are not relevant or are not used may be removed from the features 305 and the remaining features (e.g., a subset of the features 305) may be provided to the machine learning model 334.

In some embodiments, the tree 300 may include more than two classification levels. For example, the tree 300 may include three five, ten, or some other appropriate number of classification levels. Each of the additional classification levels may include or may be associated with a respective set of classifications and a respective set of machine learning models. For example, a third classification level may include a set of classifications that indicate different manufacturers of entities. The third classification level may also include machine learning models that may determine whether an entity is manufactured by a particular manufacturer.

While FIG. 3 is described with respect to function, other embodiments support trees of models for other classifications, such as operating systems. For example, for operating systems, the machine learning model 311 may classify the entity with respect to the type of operating system (e.g., Windows™, Linux, MacOS™, etc.). A second layer of machine learning models (e.g., similar to machine learning models 331 through 337) may classify a version of the operating system (e.g., Windows' XP, Windows' 10, MacOS™ X, etc.). A third layer of models (e.g., machine learning models a third classification layer) may classify a service pack or patch level associated with the operating system. The OS version, service pack or patch level, or a combination thereof may be used to perform security actions or compliance procedures (e.g., requiring certain patch levels or OS versions).

In solving the hierarchical challenges, embodiments can mitigate issues associated with imbalanced labels. Through the use of more specialized machine learning models at different levels (e.g., machine learning models applied in series or stages), embodiments are able to reduce the skew of labels because different machine learning models may focus on a specific level in the classification hierarchy. For example, using a specific machine learning model to perform classification at the first classification level (e.g., a first granularity), the output of that allows use of specialized machine learning models to handle separate branches of the hierarchy, such as accessories, networking, multimedia, healthcare, facilities, manufacturing, etc.

As discussed above if the training data is skewed towards particular classifications (e.g., there is more training data available for particular classifications), the multi-level machine learning models (with different granularities of classifications and which are trained using different sets of training data for each granularity) may be more accurate when compared to a single, monolithic machine learning model. Embodiments can thus use specialized models for each branch or level in the hierarchy. This overcomes the problem of the model being biased towards the majority class of data.

In some embodiments, each model for each stage can be tuned based on parameters (e.g., inputs, weights, etc.) specific for each model. Each model can thus be trained on different data (e.g., different sets of training data), different features, different tuning, or a combination thereof. For example, different sets of training data may be used to train each of the machine learning models 311 and 331 through 337.

The use of models at different levels of granularity further allows flexibility in the classification granularity. The granularity can be controlled by a user through configuration of one or more thresholds (e.g., confidence thresholds) associated with one or more models. This allows controlling of the accuracy of each decision at each level so that a threshold is applied at each level of the hierarchy. This control enables avoiding use of resources (e.g., processing and memory) to attempt to classify an entity that cannot be classified at a higher level of the hierarchy. For example, if an entity cannot be classified with a confidence above a threshold using machine learning model 311 (e.g., a first level machine learning model), then machine learning models 331 through 337 (e.g., second level machine learning models) may not be used to attempt to classify the entity. In addition, use of resources (e.g., processing and memory) for determining a classification using machine learning models 331 through 337 would be avoided due to the models not being used.

Using one or more first level classifications (e.g., a classification in the first classification level, one or more of classifications 321 through 327) determined (e.g., generated, calculated, identified, inferred, etc.) by machine learning model 311, a network monitor entity (e.g., network monitor entity 280 illustrated in FIG. 2, etc.) may be able to apply policies or perform other actions (e.g., other actions). For example, the operating system version of an entity can be checked to see if the entity has an approved OS version (e.g., Windows' 10) or unapproved OS version (e.g., no longer supported operating system, for instance, Windows' XP, Windows' 7, etc.). The network monitor entity may be able to obtain at least a partial classification (e.g., a first classi-fication, a first level classification, a coarser or lower granularity classification) of an entity first.

Figure 4:
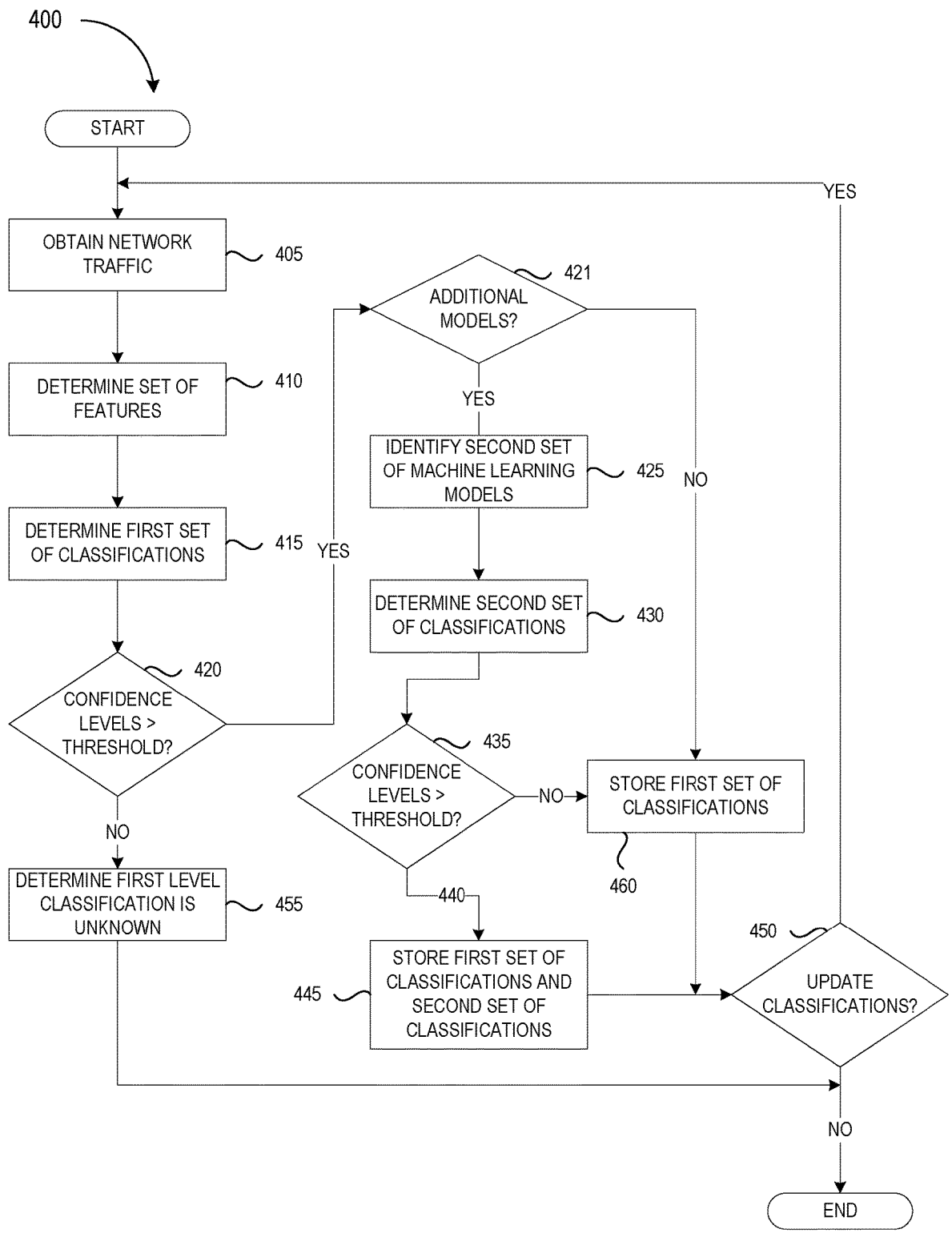
FIG. 4 depicts a flow diagram of aspects of a process for performing classification in accordance with one implementation of the present disclosure.
Figure 5:
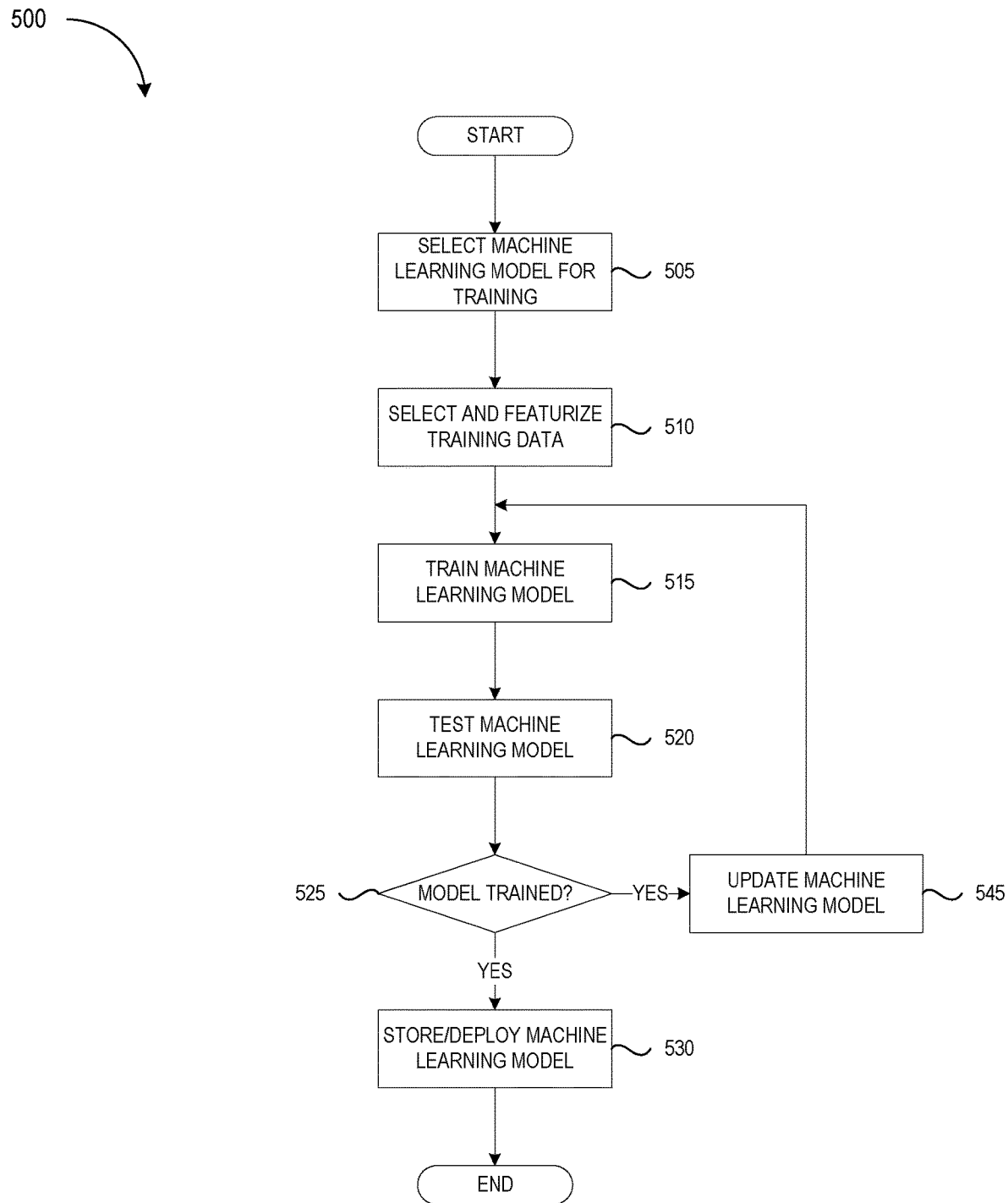
FIG. 5 depicts a flow diagram of aspects of a process for training multiple models for classification in accordance with one implementation of the present disclosure.

With reference to FIGS. 4-5, flowcharts 400-500 illustrate example operations used by various embodiments. Although specific operation blocks ("blocks") are disclosed in flowcharts 400-500, such blocks are examples. That is, embodiments are well suited to performing various other blocks or variations of the blocks recited in flowcharts 400-500. It is appreciated that the blocks in flowcharts 400-500 may be performed in an order different than presented, and that not all of the blocks in flowcharts 400-500 may be performed. The blocks of flowcharts 400-500 may be performed locally by an entity, in a cloud, or a combination thereof. One or more machine learning models may be trained in the cloud, locally, or a combination thereof by the blocks of flowchart 500. One or models (e.g., the models trained by blocks of flowchart 500) may be used to determine one or more entity classifications locally, in the cloud, or a combination thereof, by the blocks of flowchart 400.

FIG. 4 depicts a flow diagram of aspects of process 400 for performing classification in accordance with one implementation of the present disclosure. Various portions of process 400 may be performed by different components (e.g., components of system 600) of an entity or device (e.g., network monitor entity 102 or network monitor entity 280). Process 400 may classify an entity at one or more levels (where each level may have different granularities of classifications) using one or more machine learning models.

At block 405, network traffic is obtained (e.g., accessed, read, analyzed, etc.). The traffic may have been transmitted by or received by an entity. The traffic may be obtained by a network monitoring entity (e.g., network monitoring entities 102 or 280) via a port mirroring or SPAN port or via another method, as described herein. The network traffic (e.g., packets, messages, frames, etc.) may include one or more properties and property values for each entity communicatively coupled to one or more networks. The one or more properties and property values may be extracted from the network traffic. The network traffic may include active scanning properties (e.g., if active scanning is enabled).

In some embodiments, additional data (e.g., including properties and property values) is further accessed from third party systems (e.g., system 150, an external system, etc.) and used along with the network traffic. The data from third party systems may be accessed from the third party systems via a plugin or module of a network monitoring entity. For example, this data could be accessed from a variety of systems including, but not limited to, a vulnerability assessment (VA) system, a threat detection (TD) system, endpoint management system, a mobile device management (MDM) system, a firewall (FW) system, a switch system, an access point system, a WMI script, network infrastructure, an entity itself, etc.

In some embodiments, the network traffic is obtained based on an entity being selected or being communicatively coupled to a network. The entity may be selected as part of a periodic scan of the network (e.g., a scan of network 100 by network monitoring entity 102). The entity may further be selected as part of a continuous, real-time, or combination thereof scan of the network. The entity may be an endpoint, a user, etc., as described herein. An entity being communicatively coupled to the network may be detected (e.g., being communicatively coupled to network device 104 or other enforcement point). The detecting of the entity coupled to the network may include detecting the entity in response to the entity being recoupled or readmitted to the network. This may further include detecting that a user has logged into a machine or the active user account on an entity has changed.

At block 410, a set of features may be determined based on the network traffic. Determining the set of features may include determining one or more properties associated with the device, as discussed in more detail below. The properties can include data or values extracted from the network traffic (e.g., packets, messages, frames, etc.). For example, one or more properties and property values may be determined by identifying one or more keywords or variables associated with portions of a packet, protocol fields, information from Nmap, information from p0f, data from active scans (e.g., probing or sending requests to an entity), etc. Each property may be stored as a property key (e.g., property name) and value (e.g., data of the property) pair. For example, the value of a field may be a property. In another example, the presence of a keyword within a packet may be a property. The properties may include network interface card (NIC) vendor (e.g., portion of a MAC address), dynamic host control protocol (DHCP) vendor class, HTTP user agent string, operating system (OS) data, network function, transmission control protocol/internet protocol (TCP/IP) Syn Ack fingerprint, virtual machine guest OS, Nmap-Banner, Windows™ version, DHCP hostname, Macintosh Manageable, DHCP device class, Linux Manageable, open ports, DHCP options list, DHCP request list, DHCP device OS, MAC Address, Macintosh OS Version, DNS Name, Linux OS version, Switch Port power over Ethernet (PoE) connected device, system description, classified by action or operator classified, device is a NAT device, Windows services installed, and switch port name. The properties associated with an entity may be represented as key (e.g., property or property name) value sets where each property is associated with one or more associated values (e.g., a value from a portion of a packet). The properties can thus be accessed from one or more packets being transmitted over the network agentlessly or without involvement of an agent (e.g., software for collecting the properties running on the entity sending the packets).

The properties may further include identification information (e.g., serial number, etc.), entity categorization, user categorization, location, compliance, risk, or a combination thereof which may be based on fingerprints, signatures, device behavior, etc., as described herein. Embodiments are able to determine the one or more properties, or other aspects of an entity agentlessly (e.g., based on observing network traffic without needing software running on the entity to access the properties) thereby allowing properties or other aspects of an entity to be quickly determined for entities that do not have or support an agent as well as without needing an agent to be installed for entities that do support an agent. In some embodiments, the one or more properties or other aspects are determined in real-time (e.g., instantaneously or substantially instantaneously). For example, a compliance characteristic may be determined based on an antivirus scan that is specified in a network access policy.

Properties may be collected or accessed from various of sources including, from the entity, from the network environment, network entities or enforcement points (e.g., one or more switches, routers, firewalls, etc.) and any other entity or resource communicatively coupled to the network (e.g., network 100) including other systems (e.g., system 150). The properties may be determined by an entity (e.g., network monitor device 102 or network monitor device 280) that is configured to perform one or more blocks of flowchart 400.

The properties and associated data (e.g., property values, keywords, fingerprints variables, fields, etc.) may also be featurized at block 410 to generate one or more features. The values, keywords, variables, fields, etc., may be featurized (e.g., converted to a different format or value that is recognized or used by a machine learning model, such as a vector of numbers) to generate the set of features. Featurization is the process of encoding, converting, transforming, etc., information into numerical form for use with one or more models. For example, the featurization may include converting one or more values associated with a property (of an entity) into a numerical form (e.g., a vector, a matrix, a tensor, etc.) that can be processed by a machine learning model. The information in numerical form can then be used by a machine learning model to infer or determine a classification. A feature may be a set of distinguishing characteristics for each class of an entity. For example, a feature may be a set of particular properties associated with a particular class of entities. In some embodiments, the featurization may be based on keyword counts, a hash table, etc.

At block 415, a first set of classifications (e.g., one or more classifications) is determined based on a first machine learning model. The first set of classifications may be an inference determined based on the first machine learning model and the information associated with the entity (e.g., features). The classification may be a list of numbers (e.g., associated with a profile) representing one or more confidence values. This list of numbers may be list of probabilities (e.g., associated with classifications). For example, for the first machine learning model may be trained to classify an entity as an accessory device, a mobile device, a multimedia device, a network device, etc., as illustrated in FIG. 3.

In some embodiments, the first set of classifications may be determined based on multiple models and other methods (e.g., profile based classification, fingerprints based classification, etc.). For example, the first set of classifications may be based on a machine learning model trained, as described herein, a cloud based model, a model trained based on external data (e.g., data from the Internet), or a combination thereof. Each machine learning model may be trained as described with respect to FIG. 5. The classifications of may be combined based on a variety of methods including an average, voting, etc. Embodiments may support standard ensemble methodologies.

At block 420, whether one or more confidence levels of the first set of classifications is above the threshold is determined. The determination may be made by comparing the one or more confidence levels (each confidence level associated with a classification) against a confidence level threshold. The confidence level threshold may be associated with the model thereby allowing embodiments to customize or tailor thresholds as various levels (e.g., granularities) of classification. Each confidence level threshold associated with a model may be preconfigured (e.g., as part of the training process, for instance as illustrated in FIG. 5), be user configurable (e.g., via a slider bar in a GUI), or combination thereof. In some embodiments, the confidence level threshold may be a recommended value and a user may further tune or configure the confidence level threshold. If at least one confidence level is above the confidence level threshold, block 421 may be performed. If there are no confidence levels above the threshold, block 455 may be performed. At block 455, the classification of the entity (e.g., a first level classification of the entity) may be determined as unknown (e.g., unknown classification).

At block 421, whether there are additional models is determined. For example, as illustrated in FIG. 3, some classifications (e.g., computer, energy and power, industrial system, storage, wearable, etc.) may not have corresponding additional machine learning models (e.g., may not be associated with machine learning models at a different level or hierarchy). The additional models may be models associated with higher levels (e.g., different granularities) (e.g., in the tree of the classification). If there are additional models, block 425 may be performed. If there are no additional models, block 460 may be performed.

At block 425, a second set of machine learning models (e.g., one or more models) may be identified (e.g., determined, selected, accessed, etc.). For example, each classification that has a confidence level above the threshold confidence level may be associated with a machine learning model. One or more of those machine learning models (associated with classifications that had confidence levels above the threshold confidence level) may be selected. For example, the machine learning model associated with the classification that has the highest confidence level may be used or selected. In another example, the machine learning models associated with two classifications that had the two highest confidence levels may be used or selected. The second set of machine learning models may be at a next or higher classification level (e.g., may be finer grain models).

At block 430, a second set of classifications may be determined using the second set of machine learning models. The second set of classifications may be an inference determined based on the one or more machine learning models (e.g., second level models, for instance, models 331-337) and the information associated with the entity. The classification may be a list of numbers (e.g., associated with a profile) representing one or more confidence values. This list of numbers may be list of probabilities (e.g., associated with classifications). For example, for the one or more learning models may be trained to classify an entity as a type of an accessory device, such as a printer, a scanner, an IP phone, etc.

At block 435, whether one or more confidence levels of the second set of classifications is above the threshold is determined. The determination may be made by comparing the one or more confidence levels (each confidence level associated with a classification) against a confidence level threshold. As discussed above, one confidence level threshold may be used or different confidence level thresholds may be used for different machine learning models. Each confidence level threshold associated with a model may be preconfigured, be user configurable, or be a combination thereof. If at least one confidence level is above the confidence level threshold, block 445 may be performed. If there are no confidence levels above the threshold, block 460 may be performed. At block 445, the first set of classifications and the second set of classifications may be stored. At block 460, the first set of classifications may be stored. The classification may further be used to apply one or more policies, rules, or other security procedures or actions to the entity. In some embodiments, the confidence associated with the classification may be output and stored, etc.

At block 450, whether the classifications should be updated may be determined. For example, the classifications for a device or entity (e.g., first level classification, second level classifications, etc.) may be continually or periodically updated. As additional network traffic is obtained, the process 400 may be performed based on the new or additional network traffic. The number of times to update the classifications may be user configurable, based on a setting, or may continue until an instruction is received to stop update of the classifications. If the classifications should be updated, block 405 is performed. When the classifications are to be updated, blocks 415 and blocks 430 may determine sets of updated classifications for an entity.

FIG. 5 depicts a flow diagram of process 500 for training a machine learning model for classification in accordance with one implementation of the present disclosure. Various portions of process 500 may be performed by different components (e.g., components of system 600) of an entity (e.g., network monitor entity 102 or network monitor entity 280). Blocks of process 500 may be performed by a network monitoring entity (e.g., network monitor entities 102 or 280) or classification system 262.

In some embodiments, the blocks of process 500 may be used to train multiple sets of models on different sets of training data. For example, models for function at multiple levels of granularity may be trained on cloud data and Internet data resulting in a total of six models for function classification being available for classification (e.g., by blocks of flowchart 400) at various granularity levels. As another example, models for operating system (OS) may be trained on cloud data and Internet data resulting in the two additional models for OS classification.

At block 505, a machine learning model is selected for training. The model may be selected based on a selected level or granularity. For example, a machine learning model for the second classification level of tree 300 (illustrated in FIG. 3) may be selected. The blocks of process 500 may be performed on models at different levels. For example, machine learning model 311 (illustrated in FIG. 3) may be trained to determine classifications at a first classification level (e.g., at a first or coarser granularity). Machine learning model 331 (also illustrated in FIG. 3) may be trained to determine whether an entity that was classified as an accessory is a printer, IP phone, scanner, etc. The classifications of the machine learning model 331 may be at a second classification level (e.g., a second or finer granularity).

At block 510, training data is selected. For example, the training data may be selected from a set of labeled data. The labeled data may include a device/entity classification label, one or more associated properties, or a combination thereof. In some embodiments, the labeled data is accessed from a cloud resource that includes device data with labels (e.g., cloud entity data store 268). The data in the cloud resource may have been uploaded by a network monitor entity (e.g., network monitor entity 102 or 280) and may have been labeled based on classification (e.g., profiled based classification, fingerprint based classification, etc.), human input, or a combination thereof. The labeled data may include one or more properties associated with each label. The labels may include IT, server, switch, router, Windows™ operating system, Linux™ operating system, MacOS™ operating system, mobile device, SCADA device, programmable logic controller (PLC) device, access point, printer, scanner, X-ray machines, IP cameras, etc. The labels may be any function, OS, device type, etc., or other node in a classification tree (e.g., tree 300).

The training data may also be featurized at block 510. The featurization encodes the data, including labels, into numerical form for use in training the one or more machine learning models. The featurization may be substantially similar to featurization as described with respect to FIGS. 3 and 4. In some embodiments, the output of the featurization will be a vector of numbers, e.g., a matrix of numbers, which can then be used to train the model. The featurized data may be output encoded using standard machine learning methodologies.

At block 515, the machine learning model is trained based on or using the training data (e.g., the featurized training data). The model may be trained using standard training methods (e.g., XGBoost). Embodiments may use training methods including training the models on unknown sets of entities, e.g., the properties associated with unknown sets, as described herein. The training may further be based on training the machine learning model to generate classifications at a particular level or granularity.

At block 520, the machine learning model is tested (e.g., evaluated). The model may be evaluated based on accuracy and coverage for classifications based on live or production environment data (e.g., not included in the training data). Coverage refers to the model being able to classify entities over a variety of types of entities or classifications for which the model has been trained.

At block 525, a determination is made as to whether the machine learning model has been trained. For example, test data may be provided to the machine learning model and the machine learning model may generate output (e.g., inferences, results, classifications, etc.). The output may be compared with a reference output to determine whether the machine learning model is able to accurately generate classifications, inferences, etc. If the model is trained, block 530 is performed. If the model is not trained, block 545 is performed. At block 545, the machine learning model may be updated. For example, one or more weights, parameters, etc., of the machine learning model may be updated, changed, modified, etc.

At block 530, the machine learning model is stored, deployed, or a combination thereof. The model may be stored for later usage (e.g., by blocks of flowchart 400) and deployment. The model may be stored locally by an entity performing the blocks of flowchart 500, may be stored in a cloud resource (e.g., cloud based storage, for instance, cloud model data store 266), or combination thereof. The model may be deployed to a cloud resource, one or more other entities (e.g., a network monitor entity, for instance, network monitor entity 102, network monitor entity 280), or a combination thereof.

Figure 6:
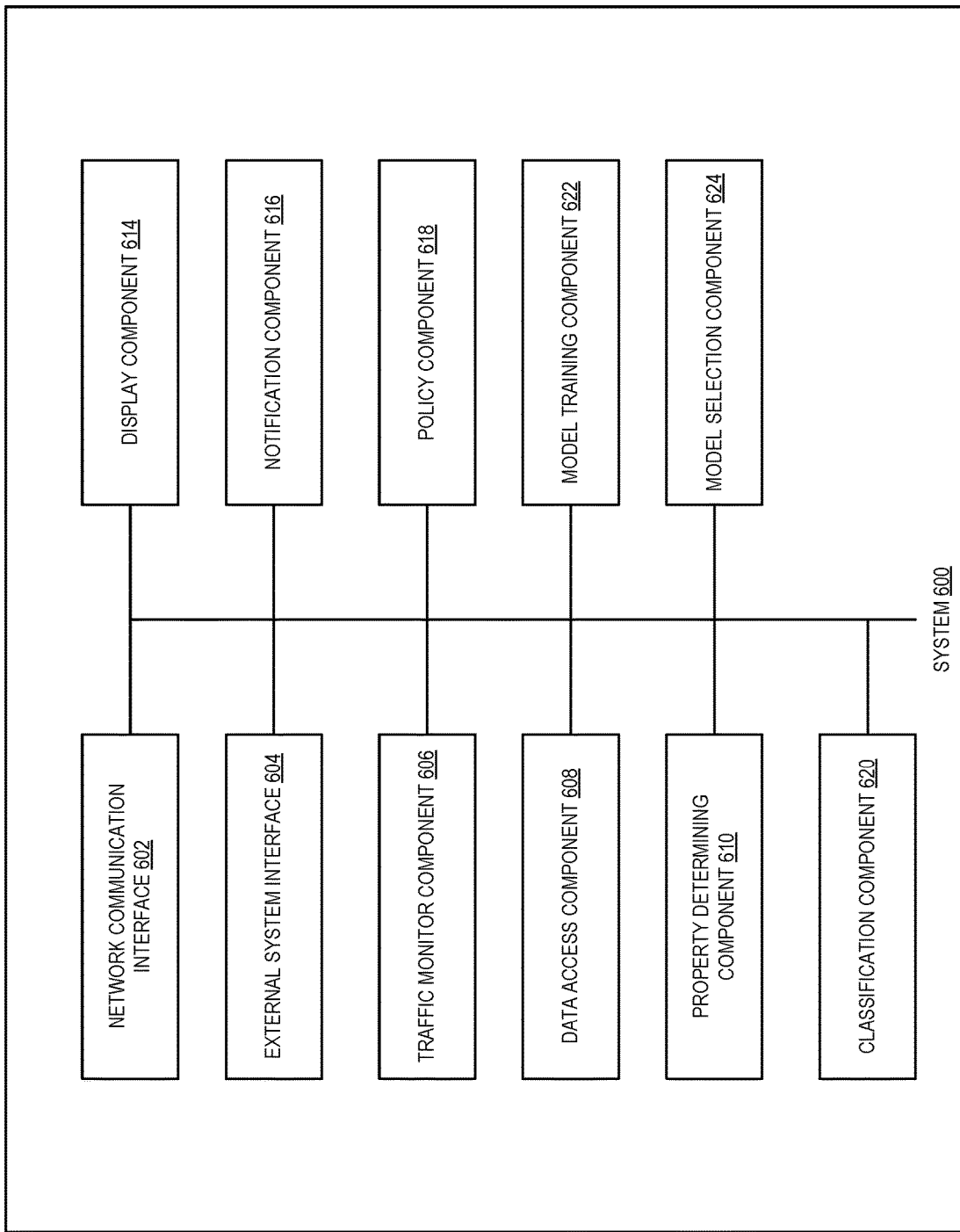
FIG. 6 depicts illustrative components of a system for classifying entities, training models, or a combination thereof in accordance with one implementation of the present disclosure.

FIG. 6 illustrates example components used by various embodiments. Although specific components are disclosed in system 600, it should be appreciated that such components are examples. That is, embodiments are well suited to having various other components or variations of the components recited in system 600. It is appreciated that the components in system 600 may operate with other components than those presented, and that not all of the components of system 600 may be required to achieve the goals of system 600.

FIG. 6 depicts illustrative components of a system for classifying entities, training models, or a combination thereof in accordance with one implementation of the present disclosure. Example system 600 or classifier 600 includes a network communication interface 602, an external system interface 604, a traffic monitor component 606, a data access component 608, a property determination component 610, a display component 614, a notification component 616, a policy component 618, a classification component 620, a model training component 622, and a model selection component 624. The components of system 600 may be part of a computing system or other electronic device (e.g., network monitor entity 102 or network monitor entity 280) or a virtual machine or device and be operable to monitor and one or more entities communicatively coupled to a network, monitor network traffic, determine one or more classifications of an entity, perform one or more actions, as described herein. For example, the system 600 may further include a memory and a processing device, operatively coupled to the memory, which may perform the operations of or execute the components of system 600. The components of system 600 may access various data and characteristics or properties associated with an entity (e.g., network communication information) and data associated with one or more entities. It is appreciated that the modular nature of system 600 may allow the components to be independent and allow flexibility to enable or disable individual components or to extend, upgrade, or combination thereof components without affecting other components thereby providing scalability and extensibility. System 600 may perform one or more blocks of flow diagrams 400-500. In some embodiments the components of 600 may be part of network monitor device (e.g., network monitor entities 102 and 280), in the cloud, or the various components may be distributed between local and cloud resources.

Communication interface 602 is operable to communicate with one or more entities (e.g., network device 104, firewall 206, switch 210, other entities coupled thereto, devices 220-222, etc.) coupled to a network that are coupled to system 600 and receive or access information about entities (e.g., device information, device communications, device characteristics, properties, etc.), access information as part of a passive scan, send one or more requests as part of an active scan, receive active scan results or responses (e.g., responses to requests), as described herein. The communication interface 602 may be operable to work with one or more components to initiate access to characteristics or determination of characteristics of an entity to allow determination of one or more properties which may then be used for device compliance, asset management, standards compliance, classification, identification, etc., as described herein. Communication interface 602 may be used to receive and store network traffic for determining properties, as described herein.

External system interface 604 is operable to communicate with one or more third party, remote, or external systems to access information including characteristics or properties about an entity (e.g., to be used to determine a security aspects). External system interface 604 may further store the accessed information in a data store. For example, external system interface 604 may access information from a vulnerability assessment (VA) system to enable determination of one or more compliance or risk characteristics associated with the entity. External system interface 604 may be operable to communicate with a vulnerability assessment (VA) system, an advanced threat detection (ATD) system, a mobile device management (MDM) system, a firewall (FW) system, a switch system, an access point (AP) system, etc. External system interface 604 may query a third party system using an API or CLI. For example, external system interface 604 may query a firewall or a switch for information (e.g., network session information) about an entity or for a list of entities that are communicatively coupled to the firewall or switch and communications associated therewith. In some embodiments, external system interface 604 may query a switch, a firewall, or other system for information of communications associated with an entity.

Traffic monitor component 606 is operable to monitor network traffic to determine if a new entity has joined the network or an entity has rejoined the network and monitor traffic for analysis by data access component 608, classification component 620, and model training component 622, as described herein. Traffic monitor component 606 may have a packet engine operable to access packets of network traffic (e.g., passively) and analyze the network traffic. The traffic monitor component 606 may further be able to access and analyze traffic logs from one or more entities (e.g., network device 104, system 150, or aggregation device 106) or from an entity being monitored. The traffic monitor component 606 may further be able to access traffic analysis data associated with an entity being monitored, e.g., where the traffic analysis is performed by a third party system.

Data access component 608 may be operable for accessing data including metadata associated with one or more network monitoring entities (e.g., network monitor entities 102 or 280-282), including properties that the network monitoring entity is monitoring or collecting, software versions (e.g., of the profile library of the network monitoring entity), and the internal configuration of the network monitoring entity. The data accessed by data access component 608 may be used by embodiments to perform classification including ensuring that the most up to date models, profiles, and other classification information is being used (e.g., by classification component 620). Data access component 608 may further access vertical or environment data and other user associated data, including vertical, environment, common type of entities for the network or network portions, segments, areas with classification issues, etc., which may be used for classification.

Data access component 608 may access data associated with active or passive traffic analysis or scans or a combination thereof. Data access component may further be able to access and analyze traffic logs from one or more entities (e.g., network device 104, system 150, or aggregation device 106) or from an entity being monitored. Data access component 608 may further be able to access traffic analysis data associated with an entity being monitored, e.g., where the traffic analysis is performed by a third party system. Information accessed by data access component 608 may be stored, displayed, and used as a basis for classification (e.g., blocks of flowchart 400), model training (e.g., blocks of flowchart 500), model evaluation, etc., as described herein.

Property determination component 610 is configured to determine one or more properties associated with an entity, as described herein. Property determination component 610 may determine one or more properties and associated values associated with an entity based on analysis (e.g., including extraction of properties and values) of network traffic, as described herein. The properties can then be stored and used by other components (e.g., classification component 620, model training component 622, model selection component 624) for performing classification, training one or more models, evaluating one or more models, and performing actions (e.g., security actions), as described herein.

Classification component 620 is configured to determine one or more classifications, e.g., at different or various levels of granularity, as described herein. Classification component 620 is further configured to determine a confidence associated with a classification (result), as described herein, which may then be compared with a confidence threshold, as described herein. Classification component 620 may further be configured to perform one or more additional classifications (e.g., using additional models) in response to a confidence threshold of a first classification being met or exceeded. The one or more additional classifications may be performed with increasingly or higher level models. Classification component 620 may use model selection component 624 to select one or more models for additional classification (e.g., during performing classification based on a tree, for instance, tree 300). Classification component 620 may further use profile libraries, entity or device fingerprints, etc., in conjunction or in place of classification using the one or more models, as described herein. Classification component 620 may use local resources (e.g., local classification engine 240), cloud resources (e.g., classification system 262), or a combination thereof for determining a classification.

Model training component 622 is configured to train one or more models at various levels of granularity (e.g., blocks of flowchart 500), as described herein. The models trained by model training component 622 may be used by classification component 620 to classify an entity at one or more granularity levels, as described herein.

Model selection component 624 is configured to select a model for use by classification component 620, as described herein. Model selection component 624 may select a model based on one or more classifications (e.g. determined by classification component 620). For example, a model for classifying an entity as a media streaming device, a smart device, etc., may be identified or selected based on the entity being classified as a multimedia device.

Display component 614 is configured to optionally display one or more graphical user interfaces or other interfaces (e.g., command line interface) for depicting various information associated with entities, classification, thresholds (e.g., confidence thresholds), and models, as described herein. In some embodiments, display component 614 may display or render a hierarchy of models (e.g., tree 300), a network graph of entities including one or more classifications, access rules associated with entities, and other access rule information (e.g., access policies, access templates, etc.).

Notification component 616 is operable to initiate one or more notifications based on the results of one or more classifications and other analysis of communications, as described herein. The notification may be any of a variety of notifications, e.g., IT ticket, email, SMS, a HTTP notification, etc., as described herein.

Policy component 618 is operable for initiating or triggering one or more remediation actions or security actions according to one or more policies, e.g., based on one or more classifications, as described herein. Policy component 618 may further be configured to perform other operations including checking compliance status, finding open ports, etc. In some embodiments, policy component 618 may verify that an assignment of one or more access rules to one or more enforcements points has been properly assigned or configured. Policy component 618 may restrict network access, signal a patch system or service, signal an update system or service, etc., as described herein. The policy component 618 may thus, among other things, invoke automatically (e.g., without user or human interaction) patching, automatically updating, and automatically restrict network access of an entity (e.g., that has out-of-date software or based on access rule violation or attempted violation).

The actions may include restricting network access to a particular level (e.g., full, limited, or no network access, for instance via an enforcement point), remediation actions (e.g., triggering patch systems or services, triggering update systems or services, triggering third party product action, etc.), informational actions (e.g., sending an email notification to a user or IT administrator or creating an IT ticket reflecting the level of compliance), and logging actions (e.g., logging or storing the compliance level). The system 600 may be software stored on a non-transitory computer readable medium having instructions encoded thereon that, when executed by a processing device, cause the processing device to obtain network traffic from a network. The network traffic may be transmitted by a first device that is communicatively coupled to the network. The instructions may further cause the processing device to determine a set of features based on the network traffic. The instructions may further cause the processing device to determine a first classification for the first device based on the set of features and a first machine learning model. The first classification may be associated with a first classification level. The instructions may further cause the processing device to identify a second machine learning model based on the first classification. The second machine learning model is associated with the first classification. The instructions may further cause the processing device to determine a second classification for the first device based on the second machine learning model. The second classification may be associated with a second classification level. The instructions may further cause the processing device to store at least one of the first classification and the second classification.

In some embodiments, the instructions may further cause the processing device to perform an action based on at least one of the first classification or the second classification. In other embodiments, the action may include one or more of a remediation action or a security action.

In some embodiments, to determine the first classification for the first device the processing device may determine a first confidence level associated with the first classification. The instructions may further cause the processing device to determine whether the first confidence level is above a threshold confidence level. The second machine learning model may be identified in response to the first confidence level being above the threshold confidence level.

In other embodiments, to determine the second classification for the first device the processing device may determine a second confidence level associated with the second classification. The instructions may further cause the processing device to determine whether the second confidence level is above the threshold confidence level. The second classification is determined in response to the second confidence level being above the threshold confidence level.

In some embodiments, the instructions may further cause the processing device to obtain additional network traffic from the network. The additional network traffic is transmitted by the first device. The instructions may further cause the processing device to determine a second set of features based on the additional network traffic. The instructions may further cause the processing device to determine an updated first classification for the first device based on the second set of features. The instructions may further cause the processing device to identify a third machine learning model based on the updated first classification. The third machine learning model may be associated with the updated first classification. The instructions may further cause the processing device to determine an updated second classification for the first device based on the third machine learning model. The instructions may further cause the processing device to store at least one of the updated first classification and the updated second classification.

In some embodiments, the instructions may further cause the processing device to determine a third classification for the first device based on the set of features. The third classification is associated with the first classification level. The instructions may further cause the processing device to identify a third machine learning model based on the third classification. The third machine learning model is associated with the third classification. The instructions may further cause the processing device to determine a fourth classification for the first device based on the third machine learning model. The fourth classification is associated with the second classification level. The instructions may further cause the processing device to store at least one of the third classification and the fourth classification.

In other embodiments, the set of features may include one or more of textual features and a device fingerprint. In other embodiments, the second classification is determined further based on one or more of the set of features or a subset of the set of features. In further embodiments, the set of features are associated with a set of properties associated with the first device.

In some embodiments, to determine the second machine learning model based on the first classification, the processing device may determine whether at least one machine learning model is associated with the first classification. The second machine learning model may be identified in response to at least one machine learning model being associated with the first classification.

Figure 7:
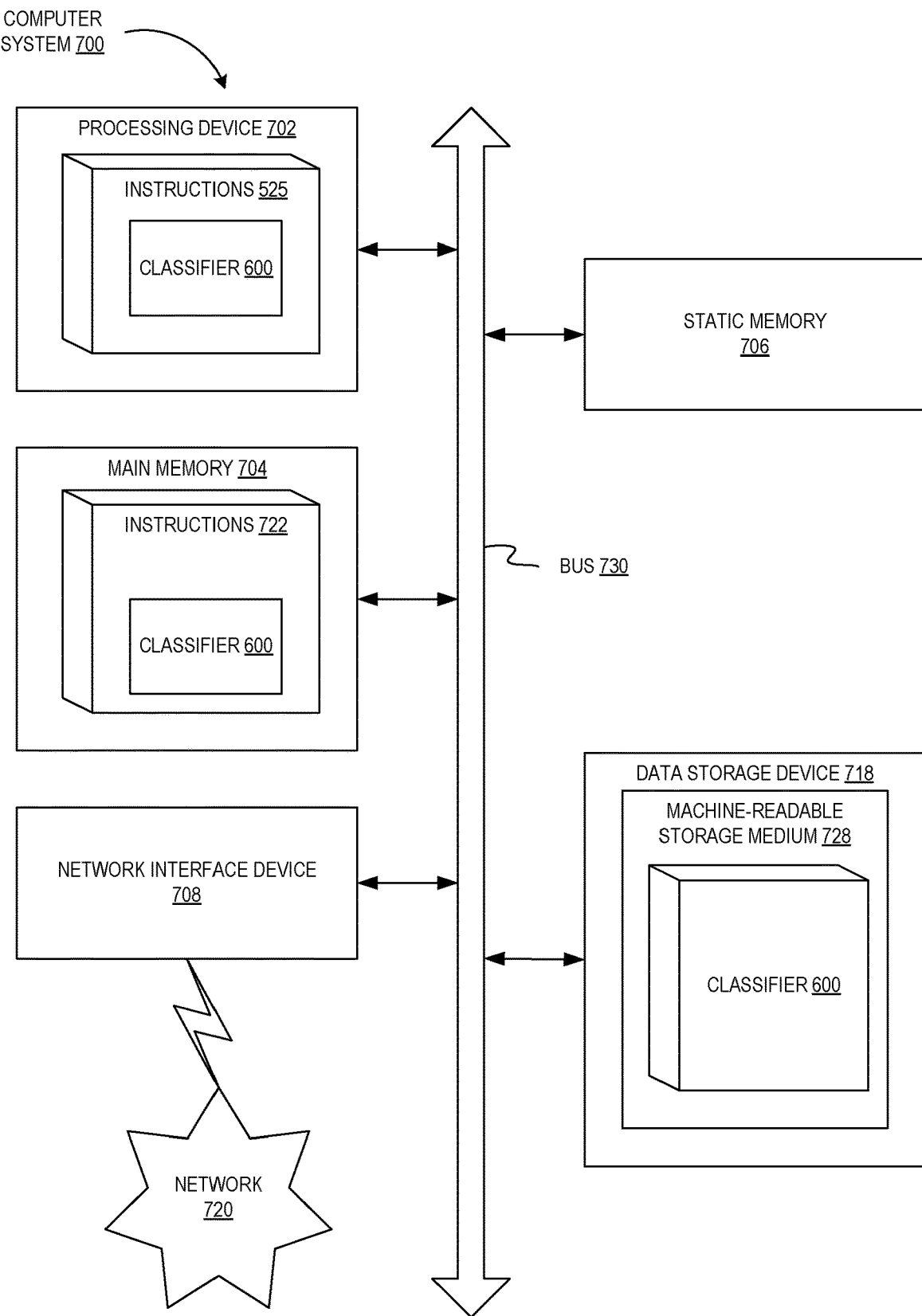
FIG. 7 is a block diagram illustrating an example computer system, in accordance with one implementation of the present disclosure.

FIG. 7 is a block diagram illustrating an example computer system, in accordance with one implementation of the present disclosure. FIG. 7 illustrates a diagrammatic representation of a machine in the example form of a computer system 700 within which a set of instructions, for causing the machine to perform any one or more of the methodologies discussed herein, may be executed. In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, a hub, an access point, a network access control device, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, computer system 700 may be representative of a server, such as network monitor entity 102 running classifier 600 to perform classification at various levels of granularity, as described herein. Classifier 600 may optionally train one or more models at various levels of granularity, as described herein.

The exemplary computer system 700 includes a processing device 702, a main memory 704 (e.g., read-only memory (ROM), flash memory, dynamic random access memory (DRAM), a static memory 706 (e.g., flash memory, static random access memory (SRAM), etc.), and a data storage device 718, which communicate with each other via a bus 730. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Processing device 702 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 702 may also be one or more special-purpose processing devices such as an application specific integrated circuit (ASIC), a field programmable gate array (FPGA), a digital signal processor (DSP), network processor, or the like. The processing device 702 is configured to execute processing logic 726, which may be one example of classifier 600 shown in FIG. 6, for performing the operations and steps discussed herein.

The data storage device 718 may include a machine-readable storage medium 728, on which is stored one or more set of instructions 722 (e.g., software) embodying any one or more of the methodologies of operations described herein, including instructions to cause the processing device 702 to execute classifier 600. The instructions 722 may also reside, completely or at least partially, within the main memory 704 or within the processing device 702 during execution thereof by the computer system 700; the main memory 704 and the processing device 702 also constituting machine-readable storage media. The instructions 722 may further be transmitted or received over a network 720 via the network interface device 708.

The machine-readable storage medium 728 may also be used to store instructions to perform a method for determining one or more classifications at various granularities, as described herein. The machine-readable storage medium 728 may also be used to store instructions to perform a method for training one or more models at various granularities, as described herein. While the machine-readable storage medium 728 is shown in an exemplary embodiment to be a single medium, the term "machine-readable storage medium" should be taken to include a single medium or multiple media (e.g., a centralized or distributed database, or associated caches and servers) that store the one or more sets of instructions. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

The preceding description sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. Particular embodiments may vary from these exemplary details and still be contemplated to be within the scope of the present disclosure.

Reference throughout this specification to "one embodiment" or "an embodiment" means that a particular feature, structure, or characteristic described in connection with the embodiments included in at least one embodiment. Thus, the appearances of the phrase "in one embodiment" or "in an embodiment" in various places throughout this specification are not necessarily all referring to the same embodiment. In addition, the term "or" is intended to mean an inclusive "or" rather than an exclusive "or."

Additionally, some embodiments may be practiced in distributed computing environments where the machine-readable medium is stored on and or executed by more than one computer system. In addition, the information transferred between computer systems may either be pulled or pushed across the communication medium connecting the computer systems.

Embodiments of the claimed subject matter include, but are not limited to, various operations described herein. These operations may be performed by hardware components, software, firmware, or a combination thereof.

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent or alternating manner.

The above description of illustrated implementations of the invention, including what is described in the Abstract, is not intended to be exhaustive or to limit the invention to the precise forms disclosed. While specific implementations of, and examples for, the invention are described herein for illustrative purposes, various equivalent modifications are possible within the scope of the invention, as those skilled in the relevant art will recognize. The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

What is claimed is:

1. A method, comprising:
   obtaining network traffic from a network, wherein the network traffic is transmitted by a first device that is communicatively coupled to the network;
   determining a set of features based on the network traffic;
   determining a first classification for the first device based on the set of features and a first machine learning model, wherein the first classification is associated with a first classification level;

identifying a second machine learning model based on the first classification, wherein the second machine learning model is associated with the first classification;
determining a second classification for the first device based on the second machine learning model, wherein the second classification is associated with a second classification level;
storing at least one of the first classification and the second classification;
obtaining additional network traffic from the network, wherein the additional network traffic is transmitted by the first device;
determining a second set of features based on the additional network traffic; determining an updated first classification for the first device based on the second set of features;
identifying a third machine learning model based on the updated first classification, wherein the third machine learning model is associated with the updated first classification;
determining an updated second classification for the first device based on the third machine learning model; and
storing at least one of the updated first classification and the updated second classification.

2. The method of claim 1, further comprising:
performing an action based on at least one of the first classification or the second classification.

3. The method of claim 2, wherein the action comprises one or more of a remediation action or a security action.

4. The method of claim 1, wherein:
determining the first classification for the first device comprises: determining a first confidence level associated with the first classification;
the method further comprises: determining whether the first confidence level is above a threshold confidence level; and
the second machine learning model is identified in response to the first confidence level being above the threshold confidence level.

5. The method of claim 4, wherein:
determining the second classification for the first device comprises: determining a second confidence level associated with the second classification;
the method further comprises: determining whether the second confidence level is above the threshold confidence level; and
the second classification is determined in response to the second confidence level being above the threshold confidence level.

6. The method of claim 1, further comprising:
determining a third classification for the first device based on the set of features, wherein the third classification is associated with the first classification level;
identifying a third machine learning model based on the third classification, wherein the third machine learning model is associated with the third classification;
determining a fourth classification for the first device based on the third machine learning model, wherein the fourth classification is associated with the second classification level; and
storing at least one of the third classification and the fourth classification.

7. The method of claim 1, wherein the set of features comprises one or more of textual features and a device fingerprint.

8. The method of claim 1, wherein the second classification is determined further based on one or more of the set of features or a subset of the set of features.

9. The method of claim 1, wherein the set of features are associated with a set of properties associated with the first device.

10. The method of claim 1, wherein:
determining the second machine learning model based on the first classification comprises determining whether at least one machine learning model is associated with the first classification; and
the second machine learning model is identified in response to at least one machine learning model being associated with the first classification.

11. A system, comprising:
a memory; and
a processing device, operatively coupled to the memory, to:
obtain network traffic from a network, wherein the network traffic is transmitted by a first device that is communicatively coupled to the network;
determine a set of features based on the network traffic;
determine a first classification for the first device based on the set of features a first machine learning model, wherein the first classification is associated with a first classification level, wherein to determine the first classification for the first device the processing device is further to determine a first confidence level associated with the first classification;
identify a second machine learning model based on the first classification, wherein the second machine learning model is associated with the first classification;
determine a second classification for the first device based on the second machine learning model, wherein the second classification is associated with a second classification level, to determine the second classification for the first device the processing device is further to determine a second confidence level associated with the second classification;
store at least one of the first classification and the second classification;
determine whether the first confidence level is above a threshold confidence level;
identify the second machine learning model in response to the first confidence level being above the threshold confidence level; and
determine whether the second confidence level is above the threshold confidence level, wherein the second classification is determined in response to the second confidence level being above the threshold confidence level.

12. The system of claim 11, wherein the processing device is further to: perform an action based on at least one of the first classification or the second classification.

13. The system of claim 12, wherein the action comprises one or more of a remediation action or a security action.

14. The system of claim 11, wherein the processing device is further to:
obtain additional network traffic from the network, wherein the additional network traffic is transmitted by the first device;
determine a second set of features based on the additional network traffic;
determine an updated first classification for the first device based on the second set of features;

identify a third machine learning model based on the updated first classification, wherein the third machine learning model is associated with the updated first classification;
determine an updated second classification for the first device based on the third machine learning model; and
store at least one of the updated first classification and the updated second classification.

15. The system of claim 11, wherein the processing device is further to:
determine a third classification for the first device based on the set of features,
wherein the third classification is associated with the first classification level;
identify a third machine learning model based on the third classification, wherein the third machine learning model is associated with the third classification;
determine a fourth classification for the first device based on the third machine learning model, wherein the fourth classification is associated with the second classification level; and
store at least one of the third classification and the fourth classification.

16. The system of claim 11, wherein:
to determine the second machine learning model based on the first classification the processing device is further to determine whether at least one machine learning model is associated with the first classification; and
the second machine learning model is determined in response to at least one machine learning model being associated with the first classification.

17. A non-transitory computer readable medium having instructions encoded thereon that, when executed by a processing device, cause the processing device to:
obtain network traffic from a network, wherein the network traffic is transmitted by a first device that is communicatively coupled to the network;
determine a set of features based on the network traffic;
determine a first classification for the first device based on the set of features a first machine learning model, wherein the first classification is associated with a first classification level;
identify a second machine learning model based on the first classification, wherein the second machine learning model is associated with the first classification;
determine a second classification for the first device based on the second machine learning model, wherein the second classification is associated with a second classification level;
store at least one of the first classification and the second classification;
determine a third classification for the first device based on the set of features,
wherein the third classification is associated with the first classification level;
identify a third machine learning model based on the third classification, wherein the third machine learning model is associated with the third classification;
determine a fourth classification for the first device based on the third machine learning model, wherein the fourth classification is associated with the second classification level; and
store at least one of the third classification and the fourth classification.

* * * * *